United States Patent
Kumei et al.

(10) Patent No.: US 9,065,099 B2
(45) Date of Patent: Jun. 23, 2015

(54) CONTROLLING FUEL CELL

(75) Inventors: Hideyuki Kumei, Shizuoka-ken (JP); Manabu Kato, Susono (JP); Kazutaka Kimura, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 210 days.

(21) Appl. No.: 13/516,575

(22) PCT Filed: Dec. 16, 2009

(86) PCT No.: PCT/JP2009/006931
§ 371 (c)(1),
(2), (4) Date: Aug. 28, 2012

(87) PCT Pub. No.: WO2011/074034
PCT Pub. Date: Jun. 23, 2011

(65) Prior Publication Data
US 2012/0321976 A1    Dec. 20, 2012

(51) Int. Cl.
*H01M 8/04* (2006.01)
*H01M 8/10* (2006.01)

(52) U.S. Cl.
CPC ...... *H01M 8/04544* (2013.01); *H01M 8/04895* (2013.01); *H01M 8/0432* (2013.01); *H01M 8/04574* (2013.01); *H01M 8/04634* (2013.01); *H01M 8/04865* (2013.01); *Y02E 60/50* (2013.01); *H01M 8/04873* (2013.01); *H01M 8/0488* (2013.01); *H01M 8/04671* (2013.01); *H01M 2008/1095* (2013.01)

(58) Field of Classification Search
CPC ...... H01M 8/04873; H01M 8/04544–8/04559; H01M 8/04574–8/04589; H01M 8/04701–8/07431; H01M 8/04865–8/0488; H01M 8/04895–8/0491; H01M 8/04962–8/04977
See application file for complete search history.

(56) References Cited

U.S. PATENT DOCUMENTS

| | | | |
|---|---|---|---|
| 2003/0039869 A1* | 2/2003 | Murakami et al. | 429/13 |
| 2003/0076110 A1 | 4/2003 | Wang et al. | |
| 2004/0245100 A1 | 12/2004 | Abouatallah | |
| 2006/0210850 A1* | 9/2006 | Abouatallah et al. | 429/22 |
| 2008/0299428 A1 | 12/2008 | Miyata et al. | |

(Continued)

FOREIGN PATENT DOCUMENTS

| | | |
|---|---|---|
| JP | 62-222573 A | 9/1987 |
| JP | 03-226973 A | 10/1991 |

(Continued)

OTHER PUBLICATIONS

International Search Report of PCT/JP2009/006931 dated Feb. 23, 2010.

(Continued)

*Primary Examiner* — Maria J Laios
*Assistant Examiner* — Robert S Carrico
(74) *Attorney, Agent, or Firm* — Sughrue Mion, PLLC

(57) ABSTRACT

A fuel cell system has a fuel cell that includes at least one cell with an electrolyte membrane, an index value acquirer and a controller. The index value acquirer obtains a temperature index value correlated to temperature of a short circuit area in each cell. The controller controls a control parameter of the fuel cell affecting the temperature of the short circuit area, such that the temperature index value is within a predetermined range set to make the temperature of the short circuit area lower than a decomposition temperature of the electrolyte membrane.

14 Claims, 26 Drawing Sheets

(56) References Cited

U.S. PATENT DOCUMENTS

| | | |
|---|---|---|
| 2009/0226773 A1 | 9/2009 | Takekawa |
| 2009/0246592 A1 | 10/2009 | Kinoshita |

FOREIGN PATENT DOCUMENTS

| | | |
|---|---|---|
| JP | 09-027336 A | 1/1997 |
| JP | 2002-208424 A | 7/2002 |
| JP | 2003-303596 A | 10/2003 |
| JP | 2005-044715 A | 2/2005 |
| JP | 2006-179389 A | 7/2006 |
| JP | 2006-331733 A | 12/2006 |
| JP | 2007-035516 A | 2/2007 |
| JP | 2008-153012 A | 7/2008 |
| JP | 2008-300299 A | 12/2008 |
| JP | 2009-043603 A | 2/2009 |
| WO | 2006/096956 A1 | 9/2006 |
| WO | 2009/116630 A1 | 9/2009 |

OTHER PUBLICATIONS

Translation of Preliminary Report on Patentability issued in corresponding International Patent Application No. PCT/JP2009/006931 dated Apr. 2, 2012.

* cited by examiner

CONTROLLING FUEL CELL

CROSS REFERENCE TO RELATED APPLICATIONS

This application is a National Stage of International Application No. PCT/JP2009/006931 filed Dec. 16, 2009, the contents of all of which are incorporated herein by reference in their entirety.

BACKGROUND

1. Technical Field

The present invention relates to controlling a fuel cell.

2. Background Art

In a fuel cell, for example, polymer electrolyte fuel cell, chemical energy of a substance is directly converted into electrical energy by electrochemical reaction of reactive gases (fuel gas and oxidizing gas) respectively supplied to a pair of electrodes (anode and cathode) placed across an electrolyte membrane.

In a fuel cell system having such a fuel cell, one known control method measures the output voltage of each of cells included in the fuel cell and gives an instruction to decrease the load when the minimum voltage among the measured output voltages is less than 0 V, while giving an instruction to increase the load when the minimum voltage is not less than a predetermined threshold value.

The known control method is shown in JP 2006-179389A, JP 2007-35516A and JP 2008-300299A, for example.

SUMMARY

A short circuit area may be generated in each cell of the fuel cell due to penetration of the base material (for example, carbon fiber) of gas diffusion layers provided to diffuse the reactive gases, through the electrolyte membrane. In the presence of a short circuit area in the cell of the fuel cell, continuing power generation at negative voltage or keeping the fuel cell at no load may cause electric current to flow through the short circuit area in the cell. The electric current flowing through the short circuit area in the cell may increase the temperature of the short circuit area to or above the decomposition temperature of the electrolyte membrane. This may cause a pinhole in the electrolyte membrane in the periphery of the short circuit area and causes performance degradation of the fuel cell.

The increasing temperature of the short circuit area in the cell by the electric current flowing through the short circuit area in the cell and the decomposition temperature of the electrolyte membrane differ depending on the resistance value of the short circuit area and the specification of the fuel cell (for example, the thickness of the electrolyte membrane). The above prior art method uniformly controls the voltage of the fuel cell with threshold values set without considering the resistance value of the short circuit area and the specification of the fuel cell. This does not effectively prevent a pinhole from being made in the electrolyte membrane.

Consequently, in order to solve at least part of the foregoing, there is a need to provide a fuel cell system and its control method that effectively prevent a pinhole from being made in an electrolyte membrane of the fuel cell.

In order to achieve at least part of the foregoing, the present invention provides various aspects and embodiments described below.

First aspect: According to a first aspect of the invention, there is provided a fuel cell system having a fuel cell including at least one cell with an electrolyte membrane, the fuel cell system comprising:

an index value acquirer configured to obtain a temperature index value correlated to temperature of a short circuit area in each cell; and a controller configured to control a control parameter of the fuel cell affecting the temperature of the short circuit area, such that the temperature index value is within a predetermined range set to make the temperature of the short circuit area lower than a decomposition temperature of the electrolyte membrane.

The fuel cell system according to this aspect obtains the temperature index value correlated to the temperature of the short circuit area in each cell and controls the control parameter of the fuel cell affecting the temperature of the short circuit area, such that the temperature index value is within the predetermined range set to make the temperature of the short circuit area lower than the decomposition temperature of the electrolyte membrane. This effectively prevents a pinhole from being made in the electrolyte membrane of the fuel cell.

Second aspect: In the fuel cell system according to the first aspect, the system may further comprise:

a resistance value acquirer configured to obtain a resistance value of the short circuit area, wherein the controller sets the predetermined range of the temperature index value, based on the resistance value of the short circuit area.

The fuel cell system according to this aspect obtains the resistance value of the short circuit area and sets the predetermined range of the temperature index value based on the obtained resistance value of the short circuit area. This enables the allowable range of the temperature index value to be set with high accuracy, thus effectively preventing a pinhole from being made in an electrolyte membrane of the fuel cell and reducing deterioration of drivability.

Third aspect: In the fuel cell system according to the second aspect, the resistance value acquirer may comprise:

a module configured to supply a fuel gas to anode of the fuel cell and an inert gas to cathode of the fuel cell;

a module configured to apply a varying voltage to the fuel cell;

a module configured to measure a current value at each voltage value; and a module configured to calculate the resistance value, based on a relationship between voltage value and current value.

The fuel cell system according to this aspect obtains the amount of cross leakage, while obtaining the resistance value of the short circuit area with high accuracy.

Forth aspect: In the fuel cell system according to the second aspect, the resistance value acquirer may comprise:

a module configured to supply an identical type of gas to anode and cathode of the fuel cell;

a module configured to apply a voltage to the fuel cell;

a module configured to measure a current value under application of the voltage; and a module configured to calculate the resistance value, based on a relationship between voltage value and current value.

The fuel cell system according to this aspect readily obtains the resistance value of the short circuit area by a simple method.

Fifth aspect: In the fuel cell system according to the fourth aspect, the identical type of gas may be either one of a fuel gas and an oxidizing gas used for power generation by the fuel cell.

The fuel cell system according to this aspect does not require any gas that is not used for power generation by the fuel cell, to obtain the resistance value of the short circuit area. This reduces the complexity of the system configuration and the control procedure and thereby enables the easier acquisition of the resistance value of the short circuit area.

Sixth aspect: In the fuel cell system according to any one of the third to fifth aspects, the resistance value acquirer may obtain the resistance value of the short circuit area before shipment of the fuel cell system.

The fuel cell system according to this aspect may not require a device for obtaining the resistance value of the short circuit area. This enables the resistance value of the short circuit area to be obtained with high accuracy, while reducing the complexity of the system configuration.

Seventh aspect: In the fuel cell system according to any one of the third to fifth aspects, the resistance value acquirer may obtain the resistance value of the short circuit area during regular check of the fuel cell system.

The fuel cell system according to this aspect takes into account the time change in resistance value of the short circuit area to adequately set the predetermined range of the temperature index value. This more effectively prevents a pinhole from being made in the electrolyte membrane.

Eighth aspect: In the fuel cell system according to any one of the third to fifth aspects, the resistance value acquirer may obtain the resistance value of the short circuit area at operation stop of the fuel cell.

The fuel cell system according to this aspect takes into account the time change in resistance value of the short circuit area to adequately set the predetermined range of the temperature index value. This more effectively prevents a pinhole from being made in the electrolyte membrane.

Ninth aspect: In the fuel cell system according to any one of the first to eighth aspects, the control parameter may be a voltage value of the fuel cell.

The fuel cell system according to this aspect controls the voltage value of the fuel cell. This makes the temperature of the short circuit area lower than the decomposition temperature of the electrolyte membrane and thereby effectively prevents a pinhole from being made in the electrolyte membrane.

Tenth aspect: In the fuel cell system according to the ninth aspect, when the temperature index value is out of the predetermined range, the controller may perform control to decrease an absolute value of voltage of the fuel cell.

The fuel cell system according to this aspect performs control to decrease the absolute value of voltage of the fuel cell, since the temperature of the short circuit area depends on the absolute value of voltage of the fuel cell. This makes the temperature of the short circuit area lower than the decomposition temperature of the electrolyte membrane and thereby effectively prevents a pinhole from being made in the electrolyte membrane.

Eleventh aspect: In the fuel cell system according to the tenth aspect, the temperature index value may be a voltage value of each cell, and when the temperature index value is out of the predetermined range and when the voltage value as the temperature index value is less than 0, the controller may perform control to increase voltage of the fuel cell.

The fuel cell system according to this aspect makes the temperature of the short circuit area lower than the decomposition temperature of the electrolyte membrane during operation at negative voltage. This effectively prevents a pinhole from being made in the electrolyte membrane.

Twelfth aspect: In the fuel cell system according to the tenth aspect, the temperature index value may be a voltage value of each cell, and when the temperature index value is out of the predetermined range and when the voltage value as the temperature index value is not less than 0, the controller may perform control to decrease voltage of the fuel cell.

The fuel cell system according to this aspect makes the temperature of the short circuit area lower than the decomposition temperature of the electrolyte membrane during operation at positive voltage (normal operation). This effectively prevents a pinhole from being made in the electrolyte membrane.

Thirteenth aspect: In the fuel cell system according to the second aspect, the temperature index value may be a voltage value of each cell, and the controller may determine whether an open circuit voltage value of each cell is reduced from an initial value, make a comparison between a first characteristic, which is an I-V characteristic of a first cell having reduced open circuit voltage value from the initial value, and a second characteristic, which is an I-V characteristic having unchanged open circuit voltage value from the initial value, control the resistance value acquirer to reacquire the resistance value of the short circuit area when there is a reduction of a corrected open circuit voltage value from the initial value in the first characteristic, which is corrected based on a difference in voltage value between the first characteristic and the second characteristic at a specified high load, and update the predetermined range based on the reacquired resistance value of the short circuit area.

The fuel cell system according to this aspect obtains the amount of drop of the open circuit voltage due to the decreased resistance value of the short circuit area, which may cause a pinhole in the electrolyte membrane, and determines whether the resistance value of the short circuit area is to be reacquired. This effectively prevents a pinhole from being made in the electrolyte membrane, while enabling efficient control.

Fourteenth aspect: In the fuel cell system according to the thirteenth aspect, the resistance value acquirer may reacquire the resistance value of the short circuit area, based on an R-V characteristic calculated from the second characteristic and the corrected open circuit voltage value in the first characteristic.

The fuel cell system according to this aspect does not require supplying an inert gas to obtain the resistance value of the short circuit area or supplying the same type of gas to both the electrodes to measure the resistance value. This effectively prevents a pinhole from being made in the electrolyte membrane, while reducing the complexity of the system configuration and the control procedure.

Fifteenth aspect: In the fuel cell system according to the second aspect, the temperature index value may be a voltage value of each cell, and the controller may determine whether a voltage value at low load of each cell, which is a voltage value of each cell at a specified low load, is reduced from an initial value, make a comparison between a first characteristic, which is an I-V characteristic of a first cell having reduced voltage at low load from the initial value, and a second characteristic, which is an I-V characteristic having unchanged voltage at low load from the initial value, control the resistance value acquirer to reacquire the resistance value of the short circuit area when there is a reduction of a corrected voltage value at low load from the initial value in the first characteristic, which is corrected based on a difference in voltage value between the first characteristic and the second characteristic at a specified high load, and update the predetermined range based on the reacquired resistance value of the short circuit area.

The fuel cell system according to this aspect obtains the amount of drop of the voltage value at low load due to the decreased resistance value of the short circuit area, which may cause a pinhole in the electrolyte membrane, without measuring the open circuit voltage, and determines whether the resistance value of the short circuit area is to be reacquired. This effectively prevents a pinhole from being made in the electrolyte membrane, while enabling the improved durability of the fuel cell and the efficient control.

Sixteenth aspect: In the fuel cell system according to the fifteenth aspect, the resistance value acquirer may reacquire the resistance value of the short circuit area, based on a first voltage value at low load, which is the corrected voltage value at low load in the first characteristic, and a current value in the second characteristic corresponding to the first voltage value at low load.

The fuel cell system according to this aspect obtains the amount of drop of the open circuit voltage due to the decreased resistance value of the short circuit area, which may cause a pinhole in the electrolyte membrane, and determines whether the resistance value of the short circuit area is to be reacquired. This effectively prevents a pinhole from being made in the electrolyte membrane, while enabling efficient control.

Seventeenth aspect: In the fuel cell system according to any one of the first to sixteenth aspects, the temperature index value may be a voltage value of the fuel cell, and the controller may set at least one different predetermined range of the temperature index value for preventing performance degradation of the fuel cell and control the control parameter of the fuel cell, such that the temperature index value is within the different predetermined range and within the predetermined range set to make the temperature of the short circuit area lower than the decomposition temperature of the electrolyte membrane.

The fuel cell system according to this aspect enables the highly robust control of the fuel cell, while effectively preventing a pinhole from being made in the electrolyte membrane. This also efficiently avoids potential degradation or deterioration of the fuel cell in a plurality of deterioration modes.

The present invention may be actualized by diversity of applications, for example, a fuel cell, a fuel cell system and methods of controlling the fuel cell and the fuel cell system.

DESCRIPTION OF THE EMBODIMENT

The invention is described in detail with reference to embodiments.

A. First Embodiment

A-1. Configuration of Fuel Cell System

Figure 1:
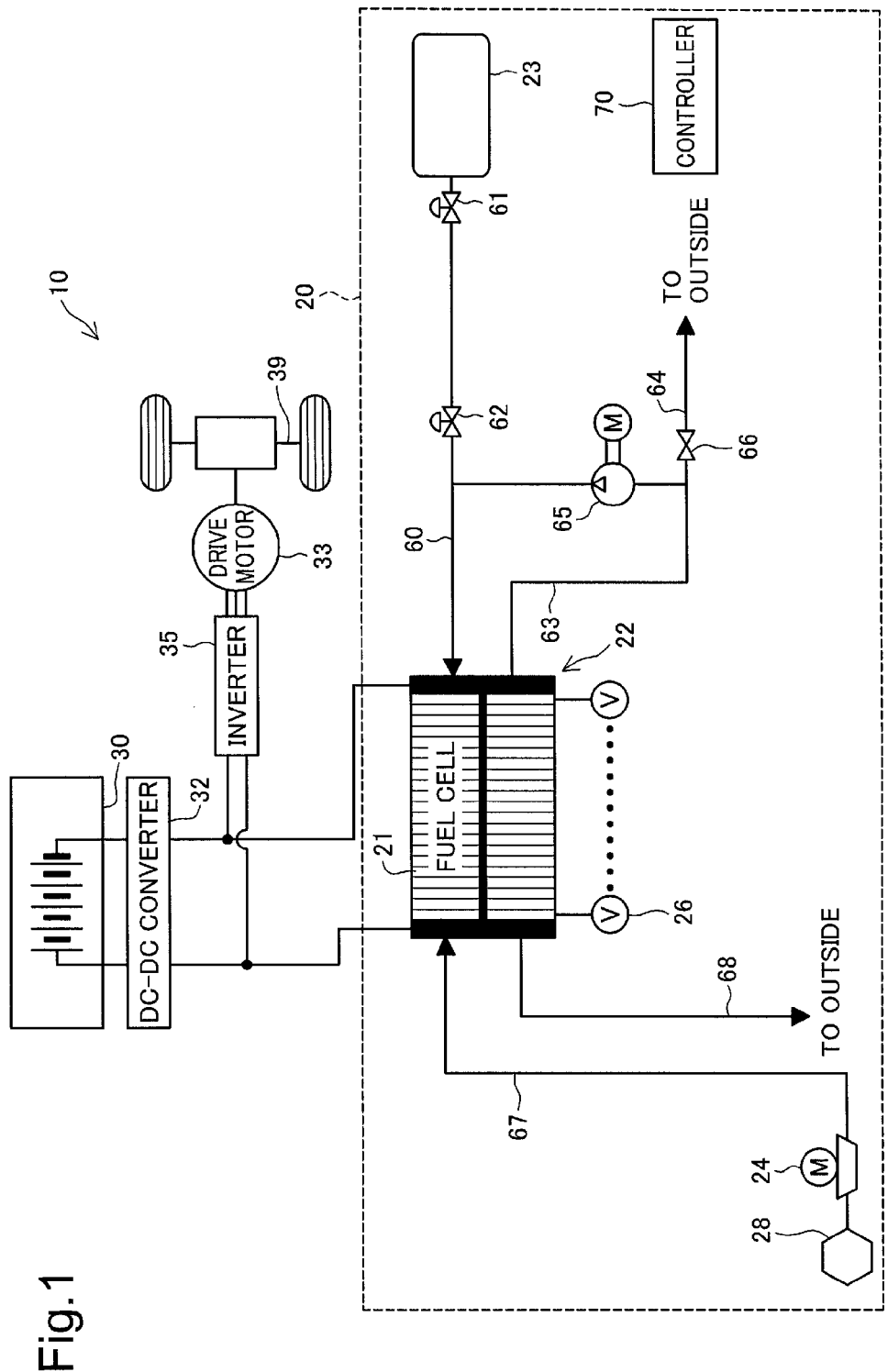
FIG. 1 schematically illustrates the configuration of an electric vehicle 10, to which a fuel cell system 20 according to a first embodiment of the invention is applicable.

FIG. 1 schematically illustrates the configuration of an electric vehicle 10, to which a fuel cell system 20 according to a first embodiment of the invention is applicable. The electric vehicle 10 includes the fuel cell system 20, a secondary battery 30 and a drive motor 33 used to drive a vehicle driveshaft 39. The fuel cell system 20 includes a fuel cell 22, a hydrogen tank 23 used to store hydrogen to be supplied to the fuel cell 22, and an air compressor 24 used to supply the compressed air to the fuel cell 22.

Hydrogen stored in the hydrogen tank 23 as the fuel gas is led to a hydrogen gas supply path 60, is subjected to pressure reduction by a pressure reducing valve 61 provided in the hydrogen gas supply path 60 and subsequent pressure adjustment to a preset pressure level by a pressure regulator 62, and is supplied to anodes in the fuel cell 22. The anode off-gas from the anodes is led through an anode off-gas flow path 63 and is recirculated to the hydrogen gas supply path 60 by means of a hydrogen pump 65. Setting an on-off valve 66 provided in an exhaust gas discharge path 64 branched off from the anode off-gas flow path 63 to ON position discharges outside part of the anode off-gas.

The air taken in from outside as the oxidizing gas via an air flow meter 28 equipped with a filter is compressed by the air compressor 24 and is supplied to cathodes in the fuel cell 22 via an oxidizing gas supply path 67. The air may be humidified before being supplied to the fuel cell 22. The cathode off-gas from the cathodes is led through a cathode off-gas flow path 68 and is discharged outside.

The fuel cell 22 may be any of various types of fuel cells and is a polymer electrolyte fuel cell according to the embodiment. The fuel cell 22 has stacked structure including a plurality of cells 21 stacked via separators (not shown). Each cell 21 is a unit module of power generation in the fuel cell 22 and includes a membrane electrode assembly (also referred to as MEA), wherein an anode and a cathode are respectively formed on opposite surfaces of an electrolyte membrane (not shown). Each cell 21 also includes gas diffusion layers placed across the MEA and provided to diffuse and supply the hydrogen gas and the air as reactive gases to the MEA. The respective cells 21 of the fuel cell 22 generate electric power through electrochemical reaction of the hydrogen gas and oxygen contained in the air. According to this embodiment, the respective cells 21 have identical structure and specification.

The fuel cell system 20 also has voltmeters 26 used to measure the voltages of the respective cells 21 (cell voltages) in the fuel cell 22 and a controller 70 configured to use signals representing the cell voltages output from the voltmeters 26 and other signals and thereby control the fuel cell system 20 as described later. The controller 70 is constructed by a microcomputer including a CPU, a ROM and a RAM.

The fuel cell system 20 is connected with the drive motor 33 via an inverter 35, and is connected with the secondary battery 30 via a DC-DC converter 32. The electric power output from the fuel cell system 20 is supplied to the drive motor 33 and is used to drive the vehicle driveshaft 39 by the drive motor 33. When the state of charge in the secondary battery 30 decreases to or below a preset level, the secondary battery 30 is charged by the fuel cell system 20. The electric power of the secondary battery 30 is used to, for example, drive the drive motor 33 in the event of power shortage.

A-2. Controlling Fuel Cell System

Figure 2:
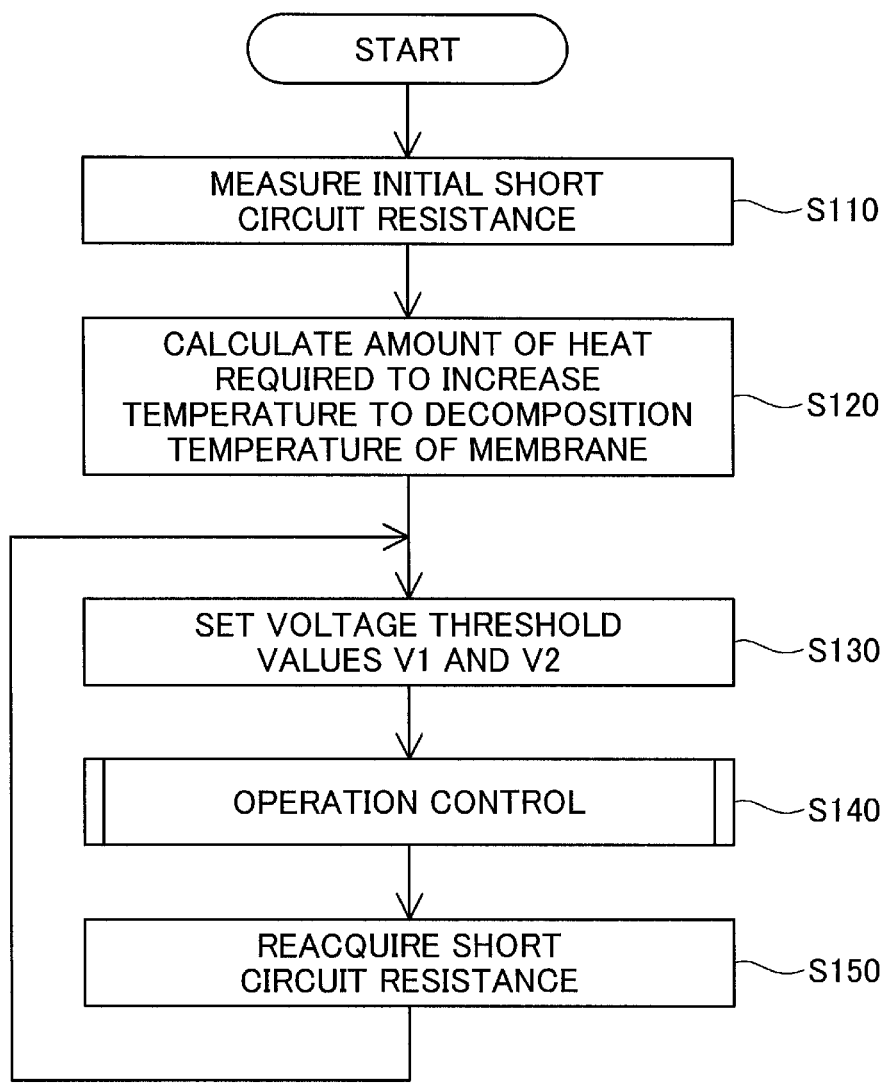
FIG. 2 is a flowchart showing a control flow of the fuel cell system 20 according to the first embodiment.

FIG. 2 is a flowchart showing a control flow of the fuel cell system 20 according to the first embodiment. At the factory shipment of the fuel cell system 20, the resistance of a short circuit area in each cell 21 of the fuel cell 22 is measured (step S110). The resistance of the short circuit area in each cell 21 measured at the factory shipment is referred to as initial short circuit resistance.

Figure 3:
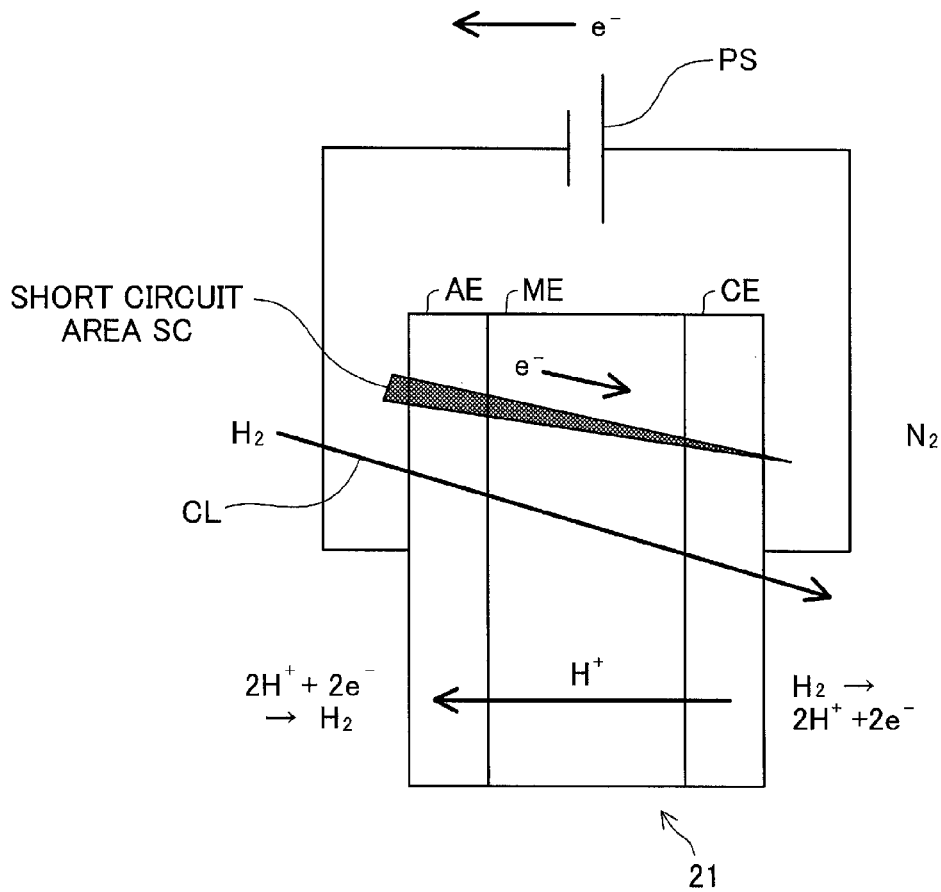
FIG. 3 illustrates one exemplary method of measuring the resistance of a short circuit area SC in the cell 21.

The resistance of the short circuit area in each cell 21 may be measured by, for example, a known method described in JP 2002-208424A. FIG. 3 illustrates one exemplary method of measuring the resistance of a short circuit area SC in the cell 21. As shown in FIG. 3, the cell 21 includes an electrolyte membrane ME, an anode AE and a cathode CE. The short circuit area SC may be generated in the cell 21, for example, due to penetration of the base material (for example, carbon fiber) of the gas diffusion layers provided to diffuse the reactive gases, through the electrolyte membrane ME. Crossover or cross leakage CL, which means leakage of the hydrogen gas from the anode AE to the cathode CE, may occur in the cell 21.

During measurement of the resistance of the short circuit area SC in each cell 21, hydrogen gas is supplied to the anode AE, while nitrogen gas as inert gas is supplied to the cathode CE. The hydrogen tank 23 and the hydrogen gas supply path 60 (FIG. 1) are used to supply the hydrogen gas to the anode AE. A nitrogen gas supply system (not shown) provided in place of the oxidizing gas supply path 67 is used to supply the nitrogen gas to the cathode CE. In this state, an external power source PS is connected with the cell 21 and applies voltages to the cell 21, such that the cathode CE has positive potential. The current value is then measured at each voltage value. In the presence of the short circuit area SC, electric current flows through the short circuit area SC during application of a voltage to the cell 21. In the presence of the cross leakage CL in the cell 21, electric current also flows, due to the reaction proceeding at the cathode CE to decompose the hydrogen gas reaching the cathode CE by the cross leakage CL into proton and electron and the reaction proceeding at the anode AE to combine proton moving from the cathode CE through the electrolyte membrane ME to the anode AE with electron to generate hydrogen.

Figure 4:
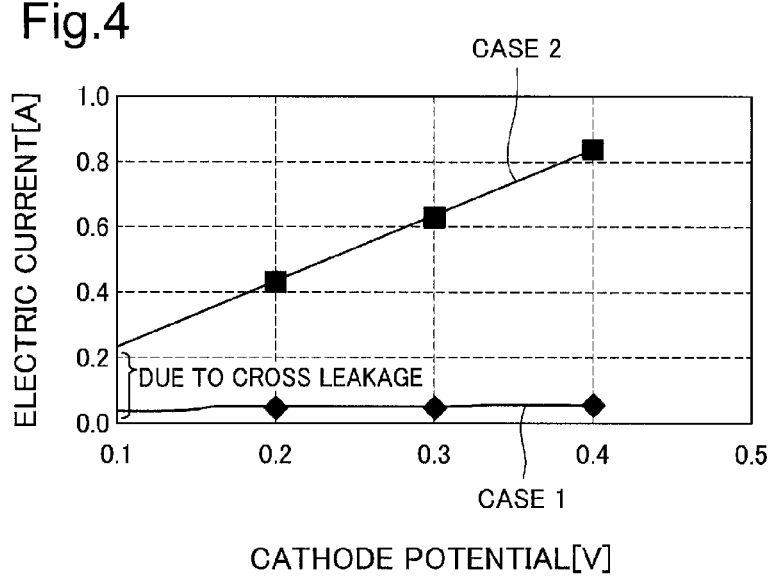
FIG. 4 is a graph showing one example of measurement results of the electric current against the cathode potential in the cell 21.

FIG. 4 is a graph showing one example of measurement results of the electric current against the cathode potential in the cell 21. Each straight line in FIG. 4 connects the measurement values of electric current at the respective values of cathode potential with respect to Case 1 having relatively large resistance of the short circuit area SC and Case 2 having relatively small resistance of the short circuit area SC. The resistance of the short circuit area SC is calculated from the slope of this straight line. Case 1 shows a slight increase in current value with an increase of the cathode potential and accordingly has large resistance of the short circuit area SC. Case 2, on the other hand, shows a significant increase in current value with an increase of the cathode potential and accordingly has small resistance of the short circuit area SC. In the absence of the short circuit area SC in the cell 21, there is theoretically no increase in current value with an increase of the cathode potential. The intercept of each straight line on the graph of FIG. 4 represents the electric current due to the cross leakage CL. This measuring method measures the cross leakage CL in addition to the resistance of the short circuit area SC, thus promoting the process efficiency during inspection before shipment.

Another suitable method different from the above method may be employed to measure the resistance of the short circuit area SC in the cell 21. For example, one available method may supply the same type of gas to both the anode AE and the cathode CE, apply a voltage between the two electrodes and calculate the resistance of the short circuit area SC based on the voltage value and the current value when the current value becomes steady. Immediately after application of a voltage between the electrodes, the electric current flows due to charging of carbon and the change of platinum oxide. The resistance of the short circuit area SC is determinable with high accuracy using the voltage value and the current value after such electric current is discharged and the current value becomes steady. The same type of gas used in this method may be hydrogen gas, the air or an inert gas, such as nitrogen gas. The voltage applied between the electrodes is preferably in a range of 0.3 V to 0.5 V.

The determined resistance of the short circuit area SC in the cell 21 is stored in the controller 70 (FIG. 1), which accordingly serves as the resistance acquirer.

Figure 5:
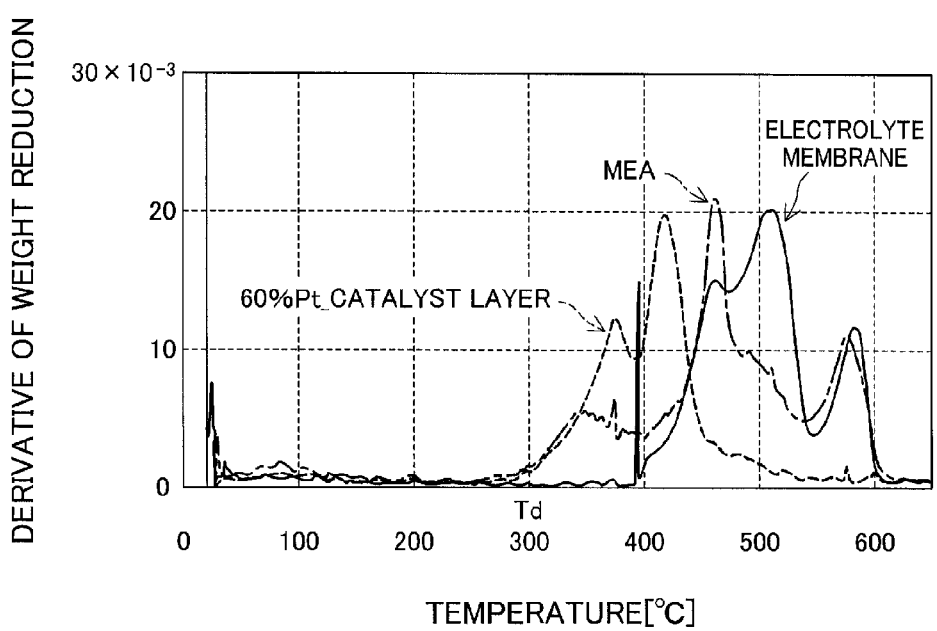
FIG. 5 illustrates one example of experimental results to set the decomposition temperature Td of the electrolyte membrane ME.

The control flow subsequently sets a decomposition temperature Td of the electrolyte membrane ME in the cell 21 and calculates the amount of heat required to increase the temperature of the electrolyte membrane ME to the decomposition temperature Td (required amount of heat Q) (step S120). FIG. 5 illustrates one example of experimental results to set the decomposition temperature Td of the electrolyte membrane ME. FIG. 5 shows the variations in derivative of weight reduction against the temperature measured by thermography with respect to the electrolyte membrane, the catalyst layer and the MEA. According to the experimental results shown in FIG. 5, the decomposition temperature Td of the electrolyte membrane ME is set to, for example, 300° C.

Figure 6:
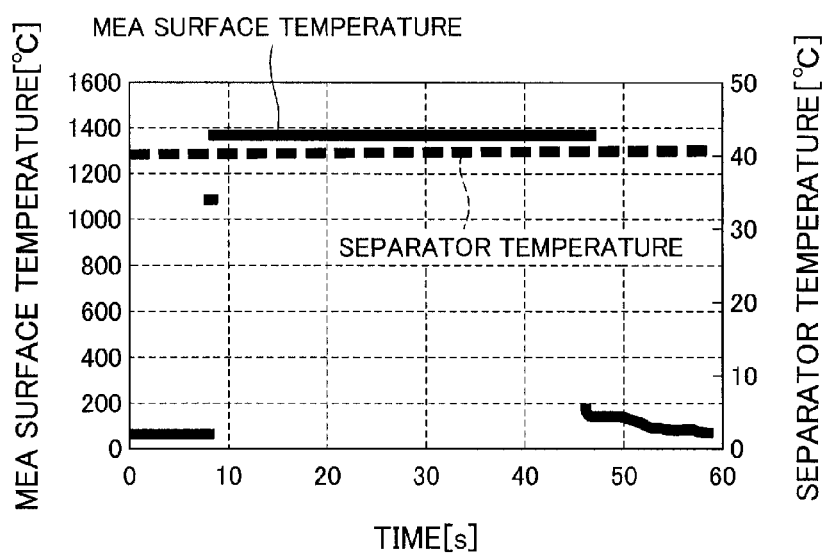
FIG. 6 illustrates one example of temperature measurement results when the electrolyte membrane ME is degraded to make a pinhole.

FIG. 6 illustrates one example of temperature measurement results when the electrolyte membrane ME is degraded to make a pinhole. FIG. 6 shows changes of the surface temperature of the MEA and the surface temperature of the separator with time under application of heat to the cell 21. Since an instrument having the upper temperature limit of about 1400° C. was used for the experiment, the temperatures of and above 1400° C. are all shown as 1400° C. in FIG. 6. In the experiment, the surface temperature of the MEA rose by more than 1000° C. within about 0.1 second when about 8 seconds had elapsed since the start of the experiment. The required amount of heat Q can thus be calculated without taking into account the heat loss to the environment. Additionally, it was confirmed that the amount of heat to be calculated was the amount of heat per 0.1 second.

Table 1 shows one example of calculation result of the required amount of heat Q. According to Table 1, the amount of heat required to increase the temperature in part of the electrolyte membrane ME corresponding to the expected diameter of a potential pinhole to the decomposition temperature Td (300° C.) (required amount of heat Q) is calculated by setting various conditions, i.e., the specification of the cell 21 including the thickness of the electrolyte membrane ME, the diameter of the gas diffusion layer base material and the specific gravities and the specific heats of the respective materials, the expected diameter of a potential pinhole, and the initial temperature. In the example of Table 1, NRE211 (25 μm in thickness) manufactured by DuPont and 25BC manufactured by SGL were respectively used for the electrolyte membrane and for the gas diffusion layer. The expected diameter of a potential pinhole was set to 1,000 μm. In the example of Table 1, the required amount of heat Q was about 0.05 J.

TABLE 1

| | |
|---|---|
| THICKNESS OF ELECTROLYTE MEMBRANE | 25 μm |
| DIAMETER OF DIFFUSION LAYER BASE MATERIAL | 7 μm |
| DIAMETER OF PINHOLE | 1,000 μm |
| INITIAL TEMPERATURE Ta | 80° C. |
| DECOMPOSITION TEMPERATURE Tb OF MEMBRANE | 300° C. |
| TEMPERATURE DIFFERENCE ΔT = (Tb − Ta) | 220° C. |
| SPECIFIC GRAVITY OF PTFE | 2 g/cm$^3$ |
| SPECIFIC GRAVITY OF CARBON | 1.5 g/cm$^3$ |
| SPECIFIC GRAVITY OF WATER | 1 g/cm$^3$ |
| SPECIFIC HEAT Cm OF ELECTROLYTE MEMBRANE | 1,100 J/(kg · K) |
| SPECIFIC HEAT Cc OF CARBON | 720 J/(kg · K) |
| SPECIFIC HEAT Cw OF WATER | 4,190 J/(kg · K) |
| HEAT OF VAPORIZATION Qv OF WATER | 40.8 kJ/mol |
| VOLUME OF DIFFUSION LAYER BASE MATERIAL | $9.62 \times 10^{-10}$ cm$^3$ |
| VOLUME OF ELECTROLYTE MEMBRANE | $1.96 \times 10^{-5}$ cm$^3$ |
| WEIGHT Wg OF DIFFUSION LAYER BASE MATERIAL | $1.44 \times 10^{-9}$ g |
| WEIGHT Wm OF ELECTROLYTE MEMBRANE | $3.93 \times 10^{-5}$ g |
| PERCENTAGE OF WATER CONTENT OF ELECTROLYTE MEMBRANE | 35% |
| WATER CONTENT Ww OF ELECTROLYTE MEMBRANE | $1.37 \times 10^{-5}$ g |
| REQUIRED AMOUNT OF HEAT Q1 (=ΔT × Cc × Wg × 1/1000) | $2.28 \times 10^{-7}$ J |
| REQUIRED AMOUNT OF HEAT Q2 (=ΔT × Cm × Wm × 1/1000) | $9.50 \times 10^{-3}$ J |
| REQUIRED AMOUNT OF HEAT Q3 (=ΔT × Cw × Ww × 1/1000) | $1.27 \times 10^{-2}$ J |
| REQUIRED AMOUNT OF HEAT Q4 (=Qv × 1000 × Ww × 1/18) | $3.11 \times 10^{-2}$ J |
| TOTAL REQUIRED AMOUNT OF HEAT Q (=Q1 + Q2 + Q3 + Q4) | 0.053 J |

After calculating the required amount of heat Q, the control flow sets voltage threshold values V1 and V2 used to prevent a pinhole from being made in the electrolyte membrane ME during control of the fuel cell 22 (step S130 in FIG. 2). A pinhole may be made in the electrolyte membrane ME both during power generation at negative voltage (i.e., power generation at the cell voltage below 0 V) and during normal power generation (i.e., power generation at the cell voltage of or above 0 V).

In the presence of the short circuit area SC in the cell 21 of the fuel cell 22, continuing the power generation at the negative voltage may increase the overvoltage of the MEA due to oxidation of carbon at the anode and drying up of the electrolyte membrane ME in the cell 21, which may cause electric current to flow through the short circuit area SC and thereby raise the temperature of the short circuit area SC. When the temperature of the short circuit area SC reaches or exceeds the decomposition temperature Td of the electrolyte membrane ME, the electrolyte membrane ME in the periphery of the short circuit area SC is degraded and disappears to make a pinhole in the electrolyte membrane ME.

In the presence of the short circuit area SC in the cell 21 of the fuel cell 22, the voltage applied to the short circuit area SC is maximized when an open circuit voltage (hereinafter referred to as "OCV") is applied to the cell 21 at no load. When the cell 21 is kept at no load under the condition of the small resistance of the short circuit area SC, electric current may flow through the short circuit area SC. This may increase the temperature of the short circuit area SC to or above the decomposition temperature Td of the electrolyte membrane ME and make a pinhole in the electrolyte membrane ME.

The voltage threshold value V1 set at step S130 is a reference value during power generation at negative voltage, and the voltage threshold value V2 is a reference value during normal power generation. According to this embodiment, the voltage value of the fuel cell 22 is an index value correlated to the temperature of the short circuit area SC in the cell 21 and serves as a control parameter of the fuel cell 22 affecting the temperature of the short circuit area SC.

Figure 7A:
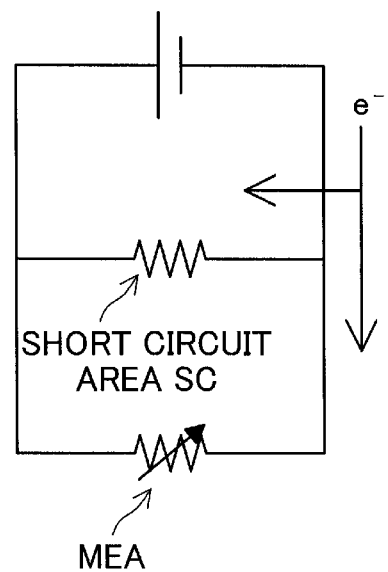
FIGS. 7A and 7B illustrate supposed circuit of cell 21 in setting the threshold value.

The process of setting the threshold value V1 during power generation at negative voltage where the cell voltage of the cell 21 is less than 0 V first assumes the MEA of the cell 21 as a variable resistance as shown in FIG. 7A and calculates an original threshold value V1o according to Equation (1) given below. In Equation (1), R represents the measured resistance of the short circuit area SC, and Q represents the required amount of heat Q described above. The original threshold value V1o shows the voltage of the cell 21 when the temperature of the short circuit area SC in the cell 21 becomes equal to the decomposition temperature Td of the electrolyte membrane ME. Controlling the fuel cell 22 to increase the voltage of the cell 21 above the original threshold value V1o causes the temperature of the short circuit area SC in the cell 21 to be lower than the decomposition temperature Td of the electrolyte membrane ME.

$$V1o = -(R \times Q)^{0.5} \quad (1)$$

Figure 8:
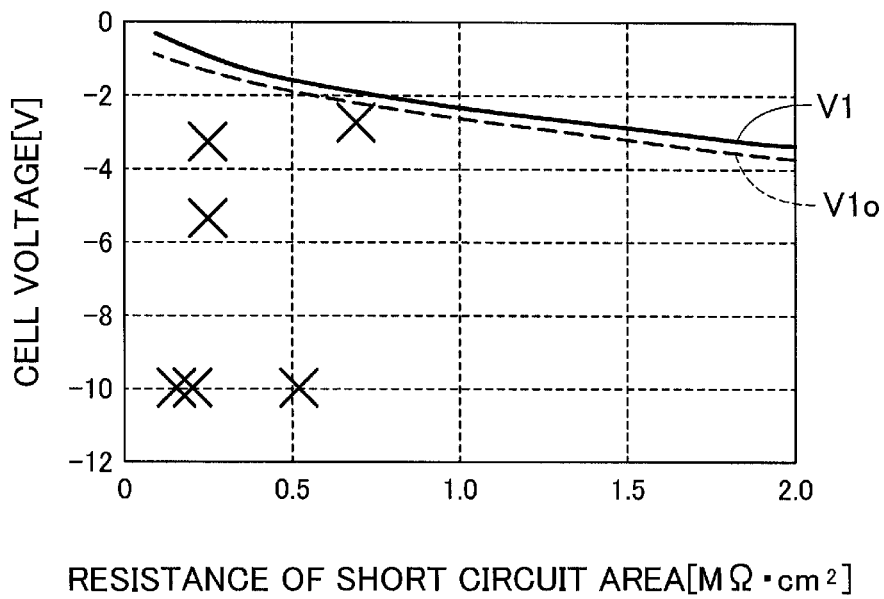
FIG. 8 illustrates one example of the original threshold value V1o and the threshold value V1 varying with the resistance of the short circuit area SC.

The threshold value V1 is set to be greater than the original threshold value V1o by adding a safety factor to the original threshold value V1o. FIG. 8 illustrates one example of the original threshold value V1o and the threshold value V1 varying with the resistance of the short circuit area SC. As shown in FIG. 8, the threshold value V1 is set for each cell 21, based on the resistance of the short circuit area SC in the cell 21. Cross marks in FIG. 8 show the experimental conditions when a pinhole is made in the electrolyte membrane ME. The experimental results prove that controlling the fuel cell 22 to make the cell voltage of the cell 21 not less than the threshold value V1 prevents a pinhole from being made in the electrolyte membrane ME.

Figure 7B:
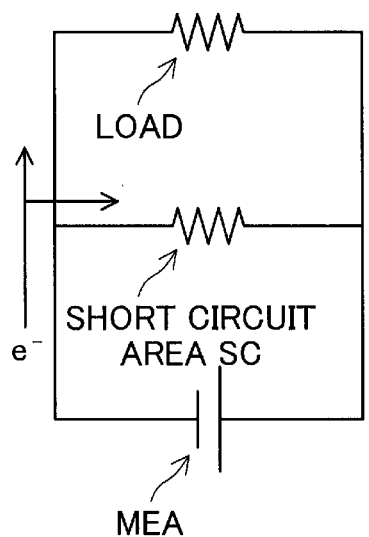

The process of setting the threshold value V2 during normal power generation where the cell voltage of the cell 21 is not less than 0 V first assumes the MEA of the cell 21 as a battery as shown in FIG. 7B and calculates an original threshold value V2o according to Equation (2) given below. In Equation (2), R represents the measured resistance of the short circuit area SC, and Q represents the required amount of heat Q described above. The original threshold value V2o shows the voltage of the cell 21 when the temperature of the short circuit area SC in the cell 21 becomes equal to the decomposition temperature Td of the electrolyte membrane ME. Controlling the fuel cell 22 to decrease the voltage of the cell 21 below the original threshold value V2o causes the temperature of the short circuit area SC in the cell 21 to be lower than the decomposition temperature Td of the electrolyte membrane ME.

$$V2o = (R \times Q)^{0.5} \quad (2)$$

Figure 9:
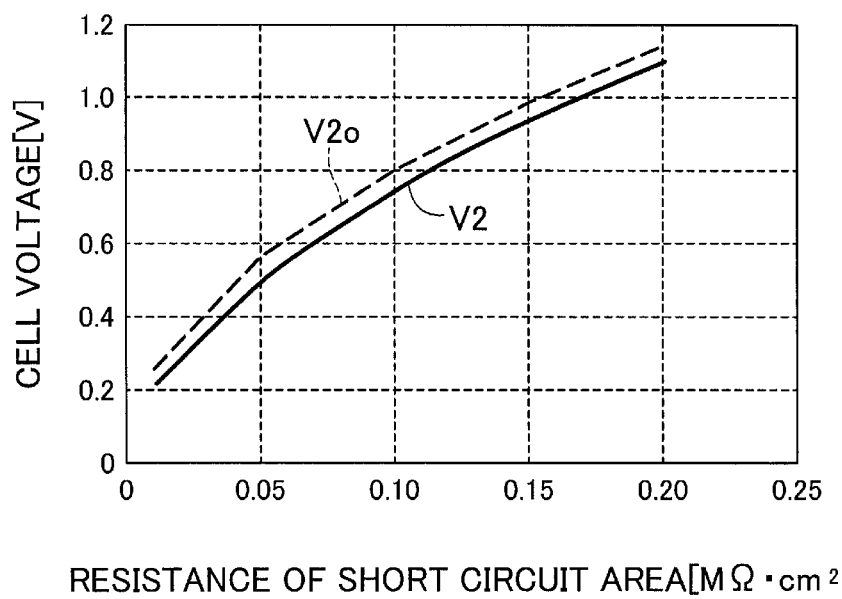
FIG. 9 illustrates one example of the original threshold value V2o and the threshold value V2 varying with the resistance of the short circuit area SC.

The threshold value V2 is set to be smaller than the original threshold value V2o by adding a safety factor to the original threshold value V2o. FIG. 9 illustrates one example of the original threshold value V2o and the threshold value V2 varying with the resistance of the short circuit area SC. As shown in FIG. 9, the threshold value V2 is set for each cell 21, based on the resistance of the short circuit area SC in the cell 21. Controlling the fuel cell 22 to make the cell voltage of the cell 21 not greater than the threshold value V2 prevents a pinhole from being made in the electrolyte membrane ME.

Figure 10:
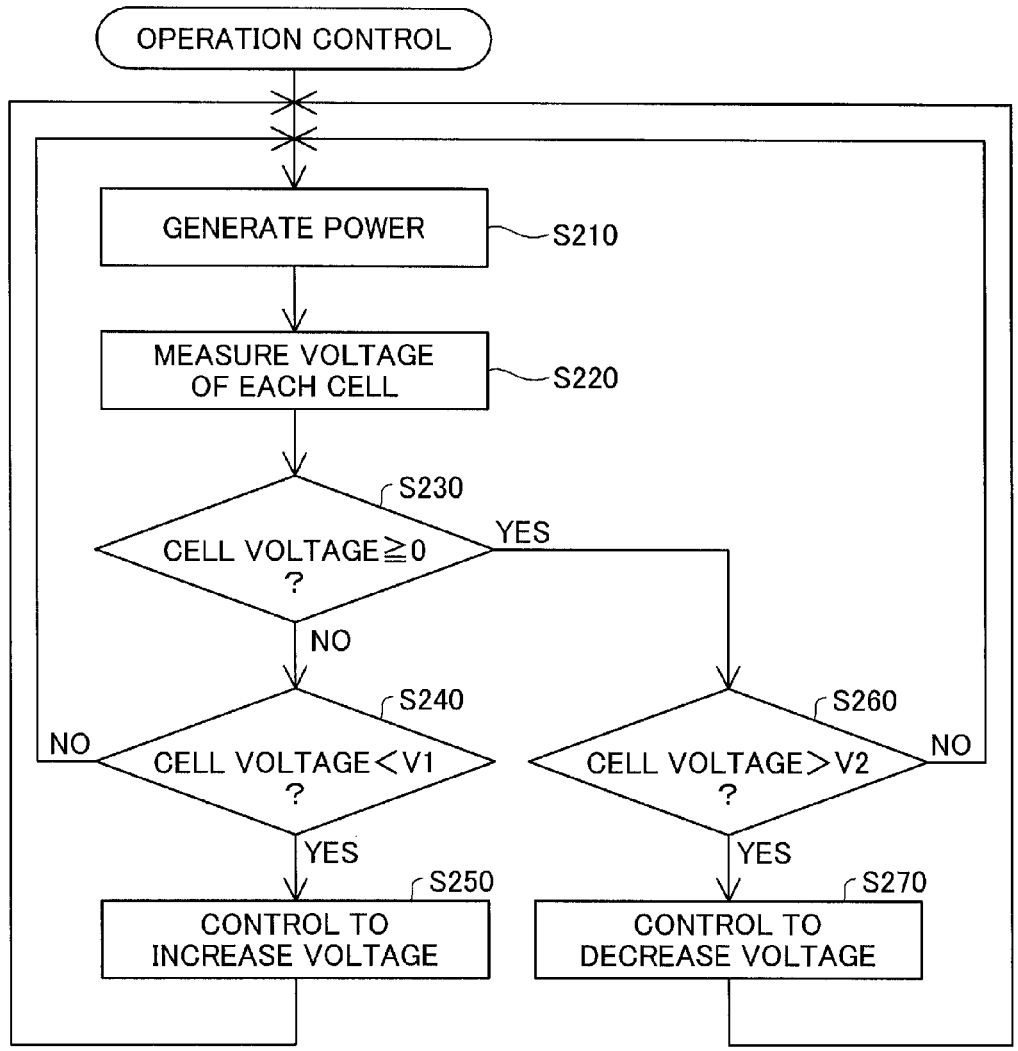
FIG. 10 is a flowchart showing the flow of operation control of the fuel cell 22 according to the first embodiment.

After setting the threshold values V1 and V2, the controller 70 performs operation control of the fuel cell 22 (step S140 in FIG. 2). FIG. 10 is a flowchart showing the flow of operation control of the fuel cell 22 according to the first embodiment. The controller 70 controls the respective constituents of the fuel cell system 20 for power generation by the fuel cell 22 (step S210) and obtains the voltage value of each cell 21 measured by the voltmeter 26 at a predetermined timing (step S220). The controller 70 accordingly serves as the index value acquirer to obtain a voltage value as a temperature index value correlated to the temperature of the short circuit area SC in the cell 21. The timing of voltage measurement may be every time a predetermined period has elapsed or every time power has been generated for a predetermined period.

When the cell voltage of the cell 21 is less than 0V (step S230: No) but is not less than the threshold value V1 set for each cell 21 (step S240: No), the controller 70 determines that there is no possibility of a pinhole made in the electrolyte membrane ME (see FIG. 8) and continues power generation (step S210). When the cell voltage of the cell 21 is less than 0V and is less than the threshold value V1 (step S240: Yes), on the other hand, the controller 70 determines that there is a possibility of a pinhole made in the electrolyte membrane ME and performs control to increase the voltage of the fuel cell 22 (step S250). More specifically, the controller 70 performs control to decrease the load (electric current), increase the circulation amount in the hydrogen gas circulation system, increase the air stoichiometric ratio or increase the humidification amount. This increases the cell voltage of each cell 21 to or above the threshold value V1 and thereby prevents a pinhole from being made in the electrolyte membrane ME.

When the cell voltage of the cell 21 is equal to or greater than 0 V (step S230: Yes) but is not greater than the threshold value V2 set for each cell 21 (step S260: No), the controller 70 determines that there is no possibility of a pinhole made in the electrolyte membrane ME (see FIG. 9) and continues power generation (step S210). When the cell voltage of the cell 21 is equal to or greater than 0 V and is greater than the threshold value V2 (step S260: Yes), on the other hand, the controller 70 determines that there is a possibility of a pinhole made in the electrolyte membrane ME and performs control to decrease the voltage of the fuel cell 22 (step S270). More specifically, the controller 70 performs control to generate power and charge the secondary battery 30 with the generated power or decrease the air stoichiometric ratio. This decreases the cell voltage of each cell 21 to or below the threshold value V2 and thereby prevents a pinhole from being made in the electrolyte membrane ME.

In summary, when it is determined that there is a possibility of a pinhole made in the electrolyte membrane ME in the decision based on the cell voltage of the cell 21 (steps S240 and S260 in FIG. 10), the fuel cell system 20 of the embodiment performs control to decrease the absolute value of the voltage of the fuel cell 22 (steps S250 and S270).

The control flow of this embodiment reacquires the resistance value of the short circuit area SC in each cell 21 at a predetermined timing after shipment of the fuel cell system 20 (step S150 in FIG. 2) and updates the threshold values V1 and V2 (sets new threshold values V1 and V2) based on the reacquired resistance value (step S130). This enables control of the fuel cell 22 using the threshold values V1 and V2 adequately set by taking into account the time change in resistance value of the short circuit area SC in each cell 21, thus effectively preventing a pinhole from being made in the electrolyte membrane.

For example, the timing of reacquiring the resistance value of the short circuit area SC may be during regular check of the fuel cell system 20. On this occasion, the same method as any of the methods of measuring the initial short circuit resistance described above may be employed to measure the resistance value of the short circuit area SC. In other examples, the timing of reacquiring the resistance value of the short circuit area SC may be on shutdown immediately after the total operation time of the fuel cell 22 exceeds a predetermined period of time or may be on shutdown immediately after the total driving distance of the electric vehicle 10 exceeds a predetermined distance. On such occasions, onboard measurement of the resistance value in the short circuit area SC is preferable. In this case, the same method as any of the methods of measuring the initial short circuit resistance described above may also be employed to measure the resistance value of the short circuit area SC. The especially preferable method adopted on these occasions supplies the same type of gas (either hydrogen gas or the air) to both the anode AE and the cathode CE, applies a voltage between the two electrodes and calculates the resistance of the short circuit area SC based on the voltage value and the current value when the current value becomes steady, since this method does not require an inert gas supply system provided in the fuel cell system 20.

In the fuel cell system 20 of the embodiment described above, the controller 70 obtains the voltage value of each cell 21 and controls the voltage of the fuel cell 22 to make the obtained voltage value within the predetermined range defined by the threshold values V1 and V2 during operation control of the fuel cell 22. The voltage of each cell 21 is correlated to the electric current flowing in the short circuit area SC in the cell 21 and is thereby correlated to the temperature of the shot circuit area SC. The voltage threshold values V1 and V2 are set to define such a voltage range as to make the temperature of the short circuit area SC lower than the decomposition temperature Td of the electrolyte membrane. The fuel cell system 20 of the embodiment thus effectively prevents a pinhole from being made in the electrolyte membrane of the fuel cell 22.

In the fuel cell system 20 of the embodiment, the voltage threshold values V1 and V2 are set based on the specification of the fuel cell 22 and the resistance value of the short circuit area SC in each cell 21, such that the temperature of the short circuit area SC is lower than the decomposition temperature Td of the electrolyte membrane. The threshold values V1 and V2 can thus be set adequately according to the specification of the fuel cell 22 and the degree of short circuit in each cell 21. This effectively prevents a pinhole from being made in the electrolyte membrane of the fuel cell 22. The fuel cell system 20 of the embodiment also allows a change in voltage value immediately before the respective threshold values V1 and V2 and thereby enables a wider allowable range of the voltage of the fuel cell 22, compared with the system of setting safety threshold values without taking into account the resistance value of the short circuit area SC and the specification of the fuel cell 22. The fuel cell system 20 of the embodiment accordingly extends the range of continuous operation without the output limit of the fuel cell 22. This enables establishment of the highly robust system with preventing deterioration of drivability. Additionally, the fuel cell system 20 of the embodiment sets the voltage threshold values V1 and V2 for each cell 21 based on the resistance value of the short circuit area SC in the cell 21 and makes a comparison between the measured voltage value and the threshold values V1 and V2 for each cell 21. This enables a wider allowable range of the voltage of the fuel cell 22, while similarly preventing deterioration of drivability, compared with the system of uniformly setting fixed threshold values for all the cells 21 and performing voltage control with the fixed threshold values.

In the fuel cell system 20 of the embodiment, the adequate threshold values V1 and V2 can be set by taking into account the time change in resistance value of the short circuit area SC in each cell 21. This effectively prevents a pinhole from being made in the electrolyte membrane, while preventing deterioration of drivability over a long period of time.

Figure 11:
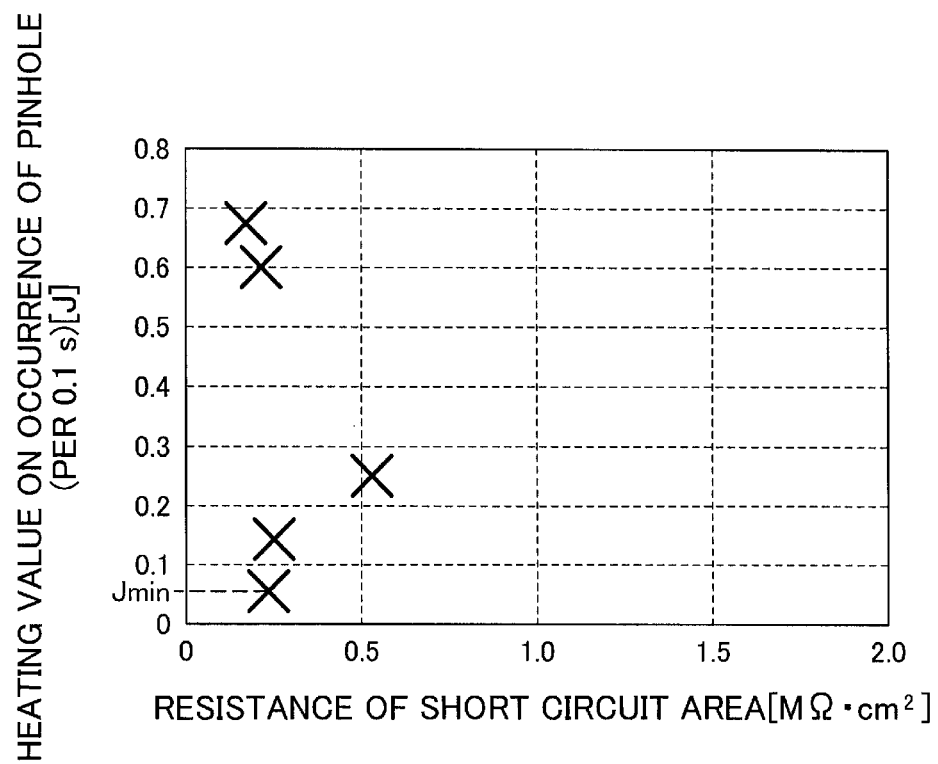
FIG. 11 illustrates one example of experimental results for setting the required amount of heat Q.

According to the embodiment described above, the control flow sets the decomposition temperature Td of the electrolyte membrane ME and calculates the amount of heat required to increase the temperature of the electrolyte membrane ME to the decomposition temperature Td (required amount of heat Q) based on the specification of the cell 21, such as the thickness of the electrolyte membrane ME. Alternatively the required amount of heat Q may be set experimentally. FIG. 11 illustrates one example of experimental results for setting the required amount of heat Q. FIG. 11 shows the correlation of the heating value (per 0.1 second) on the occurrence of a pinhole to the resistance of the short circuit area SC in the cell 21 with respect to a plurality of cells 21 of the same specification prepared under different conditions (e.g., method of making the catalyst layers and the temperature and the pressure for heat transfer), when a pinhole was made in the electrolyte membrane during power generation at negative voltage. In the illustrated example of FIG. 11, the minimum heating value (Jmin) on the occurrence of a pinhole was about 0.05 J, so that the required amount of heat Q is set to this minimum heating value.

B. Second Embodiment

B-1. Reacquisition of Resistance Value of Short Circuit Area

Figure 12:
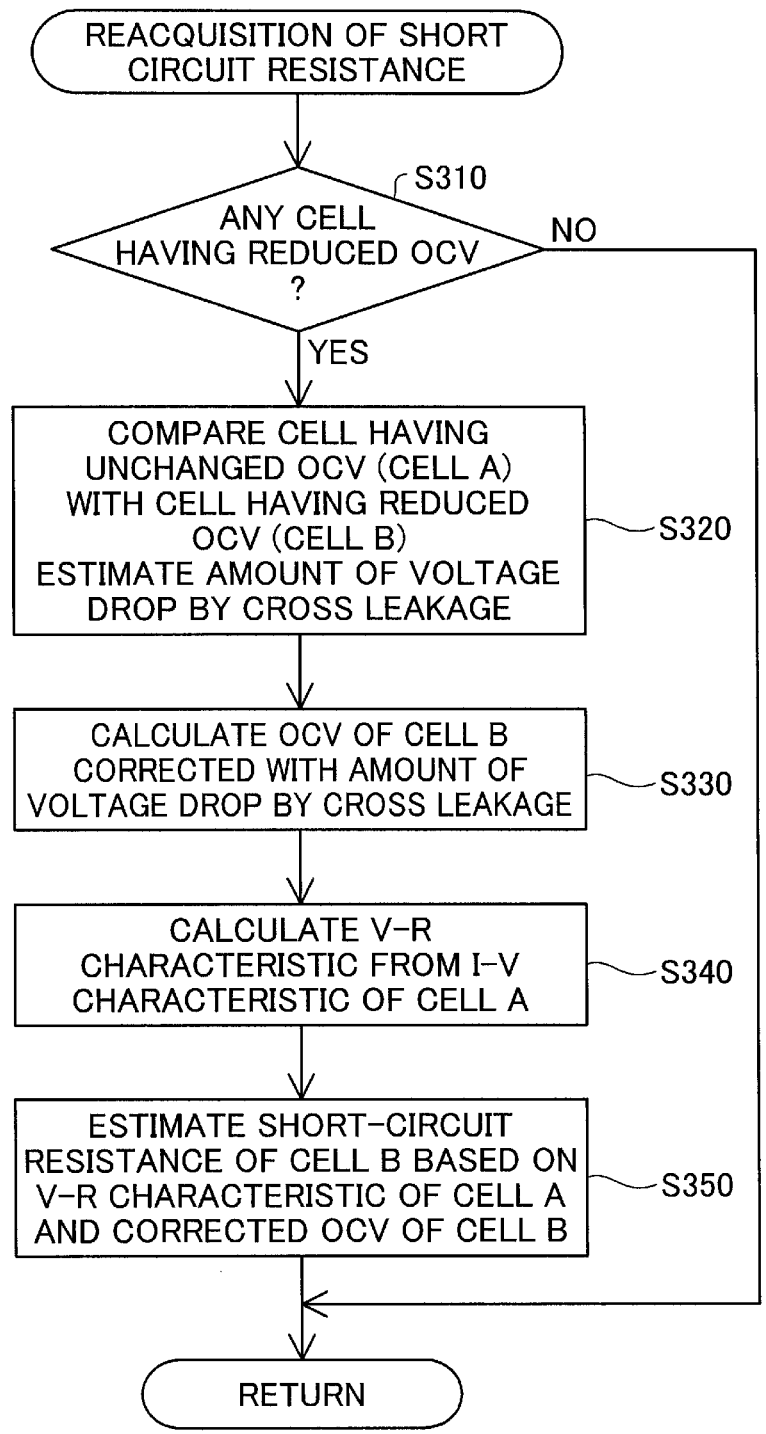
FIG. 12 is a flowchart showing the flow of reacquiring the resistance value of the short circuit area SC according to a second embodiment.

FIG. 12 is a flowchart showing the flow of reacquiring the resistance value of the short circuit area SC (step S150 in FIG. 2) according to a second embodiment. Like the first embodiment, the second embodiment requires the resistance value of the short circuit area SC in each cell 21 of the fuel cell 22 at a predetermined timing after shipment of the fuel cell system 20. Unlike the first embodiment, however, the second embodiment does not directly measure but estimates the resistance value of the short circuit area SC in each cell 21 from the characteristics of the cell 21.

The controller 70 (FIG. 1) first determines whether there is any cell 21 having the reduced OCV (open circuit voltage) from the initial value (step S310). The controller 70 stores the initial value of OCV for each cell 21, measures the voltage (OCV) of each cell 21 at no load and compares the measured voltage with the initial value for such determination. In general, the OCV is reduced by the decreased resistance value of the short circuit area SC and by the cross leakage CL. When it is determined that there is no cell 21 having the reduced OCV from the initial value, the controller 70 detects the absence of any cell 21 having the decreased resistance value of the short circuit area SC and continues the operation without resetting the threshold values V1 and V2 (step S130 in FIG. 2).

When it is determined at step S310 that there is any cell 21 having the reduced OCV from the initial value, the controller 70 measures the I-V characteristic (relation between current density and cell voltage) with respect to the cell 21 having the reduced OCV (hereinafter also referred to as cell B) and the cell 21 having the unchanged OCV from the initial value (hereinafter also referred to as cell A), and compares the two I-V characteristics to estimate the amount of voltage drop due to the cross leakage CL (step S320 in FIG. 12). The I-V characteristics used for estimation of the amount of voltage drop may be newly measured or may be calculated from the current value and the voltage value at each load recorded in advance during operation of the fuel cell system 20.

Figure 13:
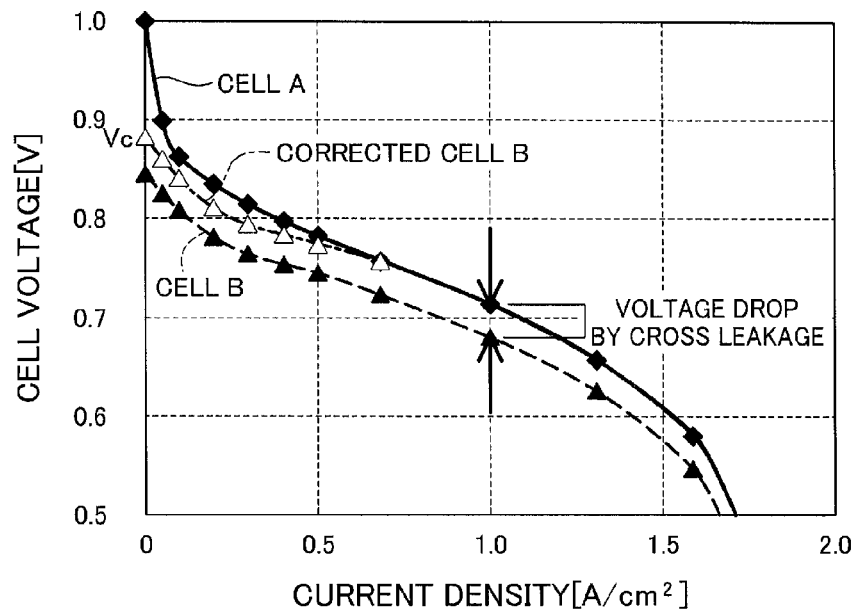
FIG. 13 illustrates one example of measurement results of the I-V characteristic of the cell 21.

FIG. 13 illustrates one example of measurement results of the I-V characteristic of the cell 21. FIG. 13 shows the measurement results of the I-V characteristic of the cell A having the unchanged OCV and the I-V characteristic of the cell B having the reduced OCV. The controller 70 estimates a voltage difference between these two I-V characteristics at a specified high load, as the amount of voltage drop due to the cross leakage CL. Such estimation is allowed since the amount of voltage drop due to the decreased resistance value of the short circuit area SC is negligibly smaller than the amount of voltage drop due to the cross leakage CL at high load and the amount of cross leakage CL is constant irrespective of the electric current. The specified high load is preferably the state that the current density is not lower than 0.5 A/cm$^2$. In the illustrated example of FIG. 13, the voltage difference between the cell A and the cell B at the current density of 1.0 A/cm$^2$ is estimated as the amount of voltage drop due to the cross leakage CL. The amount of cell voltage drop can thus be divided into the amount of voltage drop due to the cross leakage CL and the amount of voltage drop due to the decreased resistance value of the short circuit area SC.

The controller 70 subsequently calculates the OCV of the cell B corrected with the amount of voltage drop due to the cross leakage CL (step S330). FIG. 13 also shows the I-V characteristic of the cell B corrected with the amount of voltage drop due to the cross leakage CL (i.e., I-V characteristic of the cell B assumed to have no voltage drop due to the cross leakage CL). The corrected OCV of the cell B (hereinafter referred to as "corrected open circuit voltage Vc") is obtained by increasing the uncorrected OCV of the cell B by the amount of voltage drop due to the cross leakage CL. When the calculated corrected OCV of the cell B is equal to the OCV of the cell A, it is thought that the reduction of the OCV is ascribed to only the cross leakage CL. The control flow accordingly has no need to reacquire the resistance value of the short circuit area SC in the cell B and continues power generation without executing the subsequent steps in FIG. 12.

Figure 14:
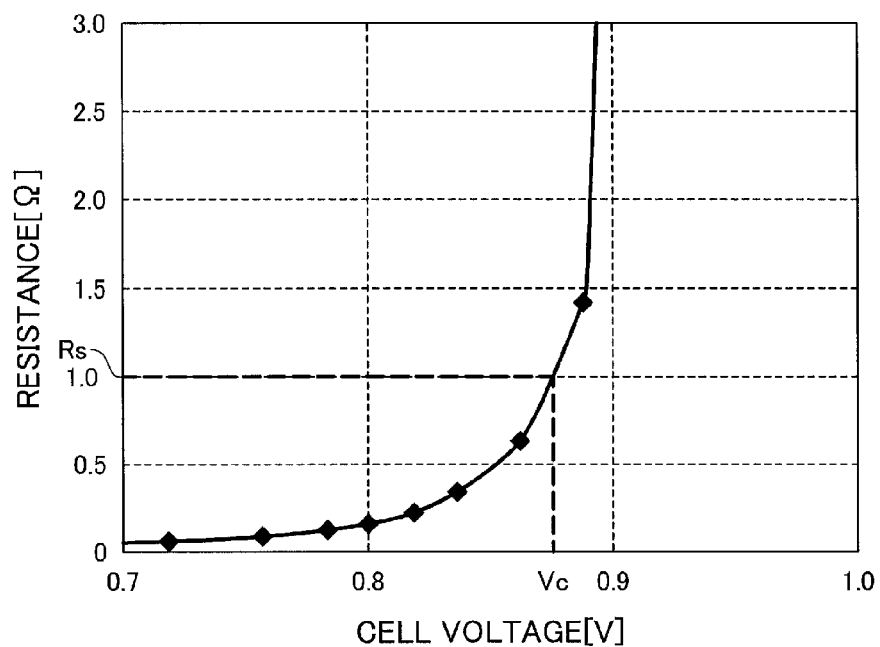
FIG. 14 illustrates one example of the calculated V-R characteristic of the cell A.

The controller 70 subsequently calculates the V-R characteristic (relation between cell voltage and resistance) from the I-V characteristic of the cell A (step S340). FIG. 14 illustrates one example of the calculated V-R characteristic of the cell A. The controller 70 estimates the resistance value of the short circuit area SC in the cell B, based on the corrected open circuit voltage Vc of the cell B and the V-R characteristic of the cell A (step S350). More specifically, the controller 70 estimates that the resistance value of the short circuit area SC in the cell B is equal to a resistance value Rs at the corrected open circuit voltage Vc of the cell B in the V-R characteristic of the cell A (FIG. 14).

Figure 15A:
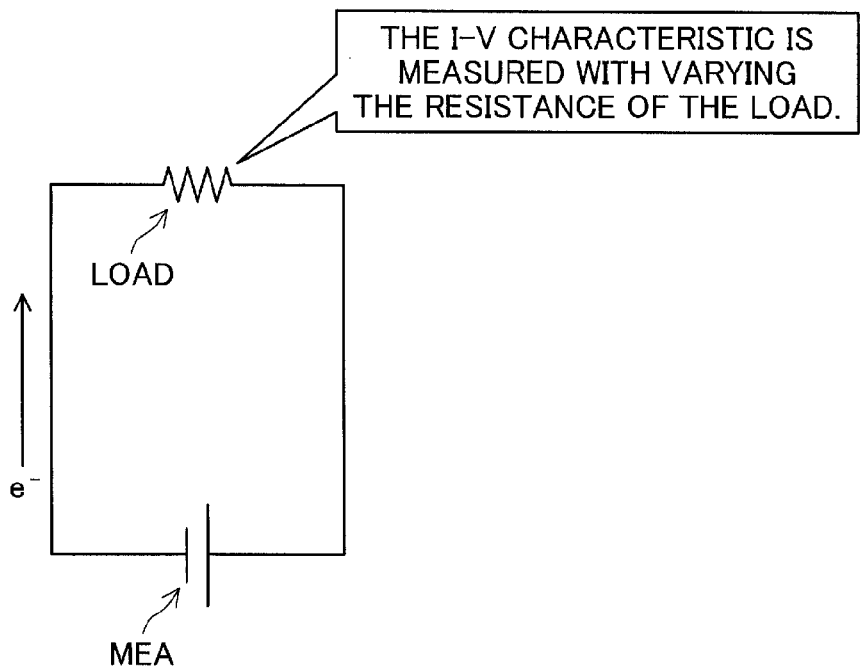
FIGS. 15A and 15B illustrate the theoretical basis of the method of estimating the resistance value of the short circuit area SC in the cell B.
Figure 15B:
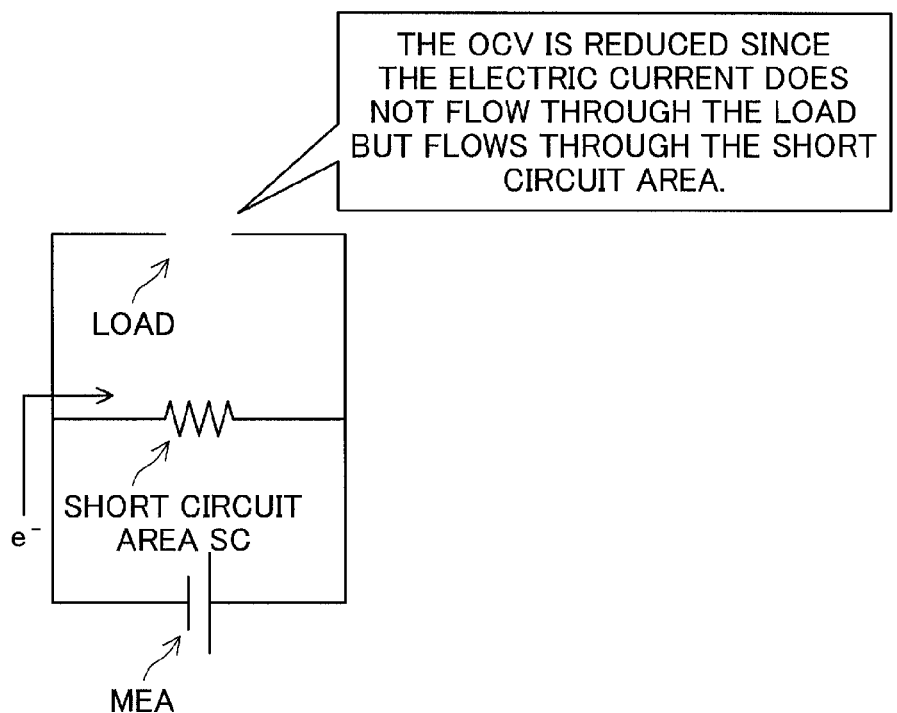

FIGS. 15A and 15B illustrate the theoretical basis of the method of estimating the resistance value of the short circuit area SC in the cell B. The measurement of the I-V characteristic of the cell A (see FIG. 13) measures the voltage value and the current value with varying the resistance of the load as shown in FIG. 15A. The V-R characteristic of the cell A is changeable from the I-V characteristic of the cell A according to the relationship of V=I·R and is thus also based on the measurement shown in FIG. 15A. The corrected open circuit voltage Vc of the cell B, on the other hand, represents the voltage applied in the short circuit area SC at no load as shown in FIG. 15B. The circuit shown in FIG. 15A is identical with the circuit shown in FIG. 15B. The resistance value of the short circuit area SC in the cell B can thus be estimated to be equal to the resistance value in the V-R characteristic of the cell A corresponding to the corrected open circuit voltage Vc of the cell B.

When it is determined at step S310 in FIG. 12 that there are a plurality of cells 21 having the reduced OCV, the processing of steps S320 to S350 is repeated for each of the plurality of cells 21 to estimate the resistance value of the short circuit area SC in each of the cells 21.

When the resistance value of the short circuit area SC in the cell B is reacquired by estimation, the second embodiment also updates the threshold values V1 and V2 (sets new threshold values V1 and V2) based on the reacquired or estimated resistance value (step S130 in FIG. 2). This enables the threshold values V1 and V2 to be adequately set by taking into account the time change in resistance value of the short circuit area SC in the cell 21 and effectively prevents a pinhole from being made in the electrolyte membrane.

According to the first embodiment described above, the same method as any of the methods of measuring the initial short circuit resistance may be employed to reacquire the resistance value of the short circuit area SC in the cell 21 (step S150 in FIG. 2) at the predetermined timing after shipment. One of the available methods measures the voltage value and the current value by applying a voltage to the cell 21 with supplying hydrogen gas to the anode AE and an inert gas to the cathode CE and calculates the resistance of the short circuit area SC from the measurement values. The other of the available methods measures the voltage value and the current value by applying a voltage between the two electrodes with supplying the same type of gas (either hydrogen gas or the air) to both the anode AE and the cathode CE and calculates the resistance of the short circuit area SC from the measurement values. Employing the method using the inert gas to reacquire the resistance value of the short circuit area SC, however, requires the fuel cell system 20 to have an inert gas supply system (e.g., tank for storing the inert gas) that is not needed for the operation itself of the fuel cell system 20 and also requires an additional step of fully replacing the atmosphere of the cathode CE with the inert gas. This undesirably complicates the system configuration and the control procedure. Employing the method supplying hydrogen gas to the two electrodes, i.e., both the anode AE and the cathode CE to reacquire the resistance value of the short circuit area SC requires an additional step of fully replacing the atmosphere of the cathode CE with hydrogen gas and an additional piping provided to supply the hydrogen gas to the cathode CE. This also undesirably complicates the system configuration and the control procedure. The same is true when the method supplying the air to the two electrodes is employed. The second embodiment, on the other hand, estimate the amount of voltage drop due to the cross leakage CL based on the comparison between the I-V characteristics of the cell B having the reduced OCV from the initial value and the cell A having the unchanged OCV, and estimates the resistance value of the short circuit area SC in the cell B based on the V-R characteristic calculated from the I-V characteristic of the cell A and the open circuit voltage of the cell B corrected with the amount of voltage drop due to the cross leakage CL. This does not require using the inert gas or supplying the same type of gas to the two electrodes to reacquire the resistance value of the short circuit area SC. The fuel cell system 20 of the second embodiment thus effectively prevents a pinhole from being made in the electrolyte membrane of the fuel cell 22, while reducing the complexity of the system configuration and the control procedure.

According to the second embodiment, the amount of cell voltage drop can be divided into the amount of voltage drop due to the cross leakage CL and the amount of voltage drop due to the decreased resistance value of the short circuit area SC. The occurrence of a pinhole in the electrolyte membrane is ascribed not to the cross leakage CL but to the decreased resistance value of the short circuit area SC. The second embodiment obtains the amount of drop of the open circuit voltage OCV due to the decreased resistance value of the short circuit area SC, which may cause a pinhole in the electrolyte membrane, and determines whether the resistance value of the short circuit area SC in the cell B is to be reacquired. The second embodiment sets the voltage threshold values V1 and V2 by taking into account only the drop of cell voltage due to the decreased resistance value of the short circuit area SC. This enables a wider allowable range of the voltage of the fuel cell 22 and prevents deterioration of drivability.

B-2. Modifications of Second Embodiment

Figure 16:
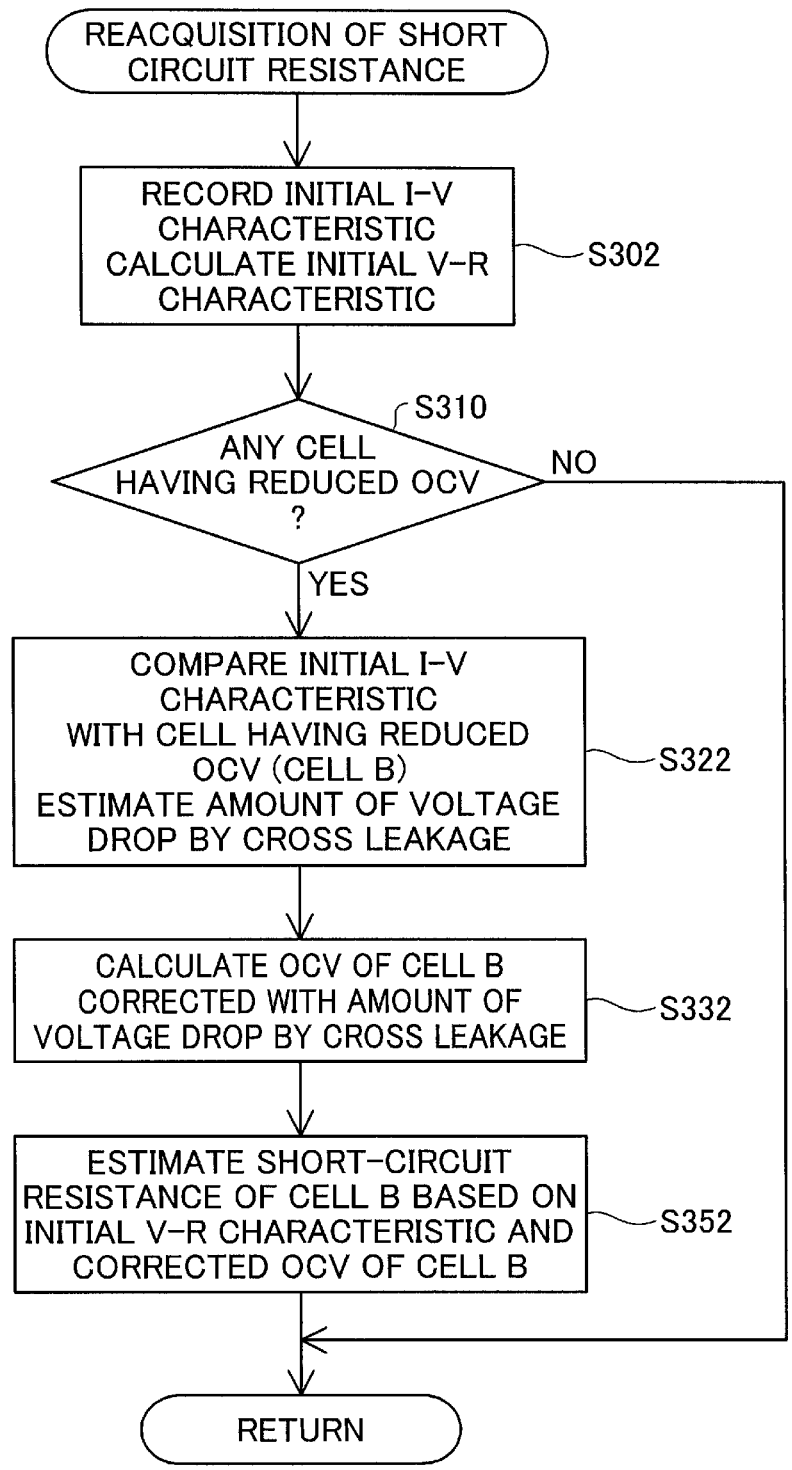
FIG. 16 is a flowchart showing the flow of reacquisition of the resistance value of the short circuit area SC (step S150 in FIG. 2) according to a first modification of the second embodiment.

FIG. 16 is a flowchart showing the flow of reacquisition of the resistance value of the short circuit area SC (step S150 in FIG. 2) according to a first modification of the second embodiment. The first modification of the second embodiment shown in FIG. 16 uses the recorded initial characteristic, instead of the characteristic of the cell 21 having the unchanged OCV from the initial value (cell A) used in the second embodiment described above (FIG. 12). In the modification shown in FIG. 16, the I-V characteristic of the cell 21 is recorded before shipment (initial I-V characteristic). The controller 70 calculates the V-R characteristic (initial V-R characteristic) from the recorded initial I-V characteristic (step S302). The initial characteristic may be recorded for each cell 21. Alternatively the initial characteristic may be recorded only for one representative cell 21, since the respective cells 21 of the fuel cell 22 have identical configuration and specification.

The control flow subsequently determines whether there is any cell 21 having the reduced OCV from the initial value (step S310). When it is determined that there is any cell 21 having the reduced OCV, the control flow measures the I-V characteristic of the cell B having the reduced OCV, compares the measured I-V characteristic with the initial I-V characteristic and estimates the amount of voltage drop due to the cross leakage CL (step S322). The control flow subsequently calculates the OCV of the cell B corrected with the amount of voltage drop due to the cross leakage CL (corrected open circuit voltage Vc) (step S332) and estimates the resistance value of the short circuit area SC in the cell B, based on the corrected open circuit voltage Vc of the cell B and the initial V-R characteristic (step S352).

The modification shown in FIG. 16 can estimate the resistance value of the short circuit area SC in the cell B by using the recorded initial characteristic, even when there is no cell 21 having the unchanged OCV from the initial value. This effectively prevents a pinhole from being made in the electrolyte membrane of the fuel cell 22, while reducing the complexity of the system configuration and the control procedure.

Figure 17:
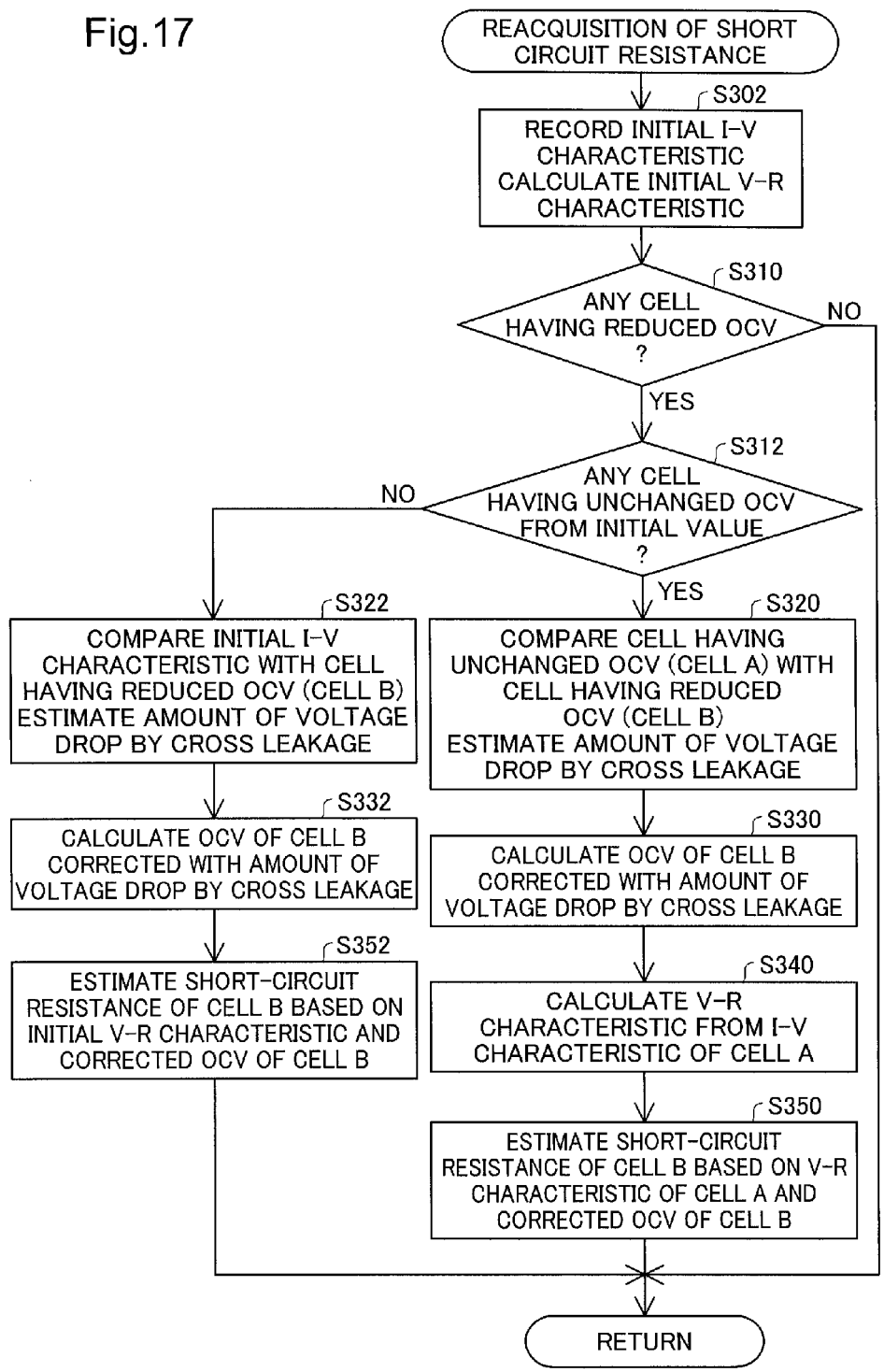
FIG. 17 is a flowchart showing the flow of reacquisition of the resistance value of the short circuit area SC according to a second modification of the second embodiment.

FIG. 17 is a flowchart showing the flow of reacquisition of the resistance value of the short circuit area SC (step S150 in FIG. 2) according to a second modification of the second embodiment. Like the modification shown in FIG. 16, the second modification of the second embodiment shown in FIG. 17 records the initial I-V characteristic of the cell 21 and calculates the initial V-R characteristic from the recorded initial I-V characteristic (step S302) and determines whether there is any cell 21 having the reduced OCV from the initial value (step S310). When it is determined that there is any cell 21 having the reduced OCV, the modified control flow subsequently determines whether there is any cell 21 having the unchanged OCV from the initial value (step S312). When it is determined that there is any cell 21 having the unchanged OCV from the initial value, the modified control flow makes a comparison between the cell 21 having the unchanged OCV (cell A) and the cell 21 having the reduced OCV (cell B) and estimates the resistance value of the short circuit area SC in the cell B (steps S320 to S350), in the same manner as the second embodiment shown in FIG. 12. When it is determined that there is no cell 21 having the unchanged OCV from the initial value, on the other hand, the modified control flow makes a comparison between the recorded initial characteristic and the cell B having the reduced OCV and estimates the resistance value of the short circuit area SC in the cell B (steps S322 to S352), in the same manner as the first modification of the second embodiment shown in FIG. 16.

During power generation in the fuel cell system 20, there may be a change in I-V characteristic due to performance degradation by another cause (for example, degradation of catalyst), in addition to the change in I-V characteristic due to the short circuit in each cell 21 and due to the cross leakage CL. The change of the I-V characteristic due to such performance degradation is assumed to be substantially uniform in the respective cells 21 of the fuel cell 22. It is accordingly expected that the method of estimating the resistance value of the short circuit area SC based on the comparison between the cell A having the unchanged OCV from the initial value and the cell B having the reduced OCV according to the second embodiment shown in FIG. 12 is less susceptible to error accompanied by the change of the I-V characteristic due to the performance degradation and thereby has the higher accuracy of estimation, compared with the method of estimating the resistance value of the short circuit area SC based on the comparison between the initial characteristic and the cell B having the reduced OCV according to the first modification of the second embodiment shown in FIG. 16. The second modification of the second embodiment shown in FIG. 17 employs the estimation method of the higher accuracy (i.e., the method of the second embodiment) when there is any cell 21 having the unchanged OCV from the initial value and the method of the second embodiment is accordingly allowed, while employing the method of the first modification of the second embodiment when there is no cell 21 having the unchanged OCV from the initial value and the method of the second embodiment is accordingly not allowed. The second modification of the second embodiment shown in FIG. 17 can thus deal with diverse situations and improve the estimation accuracy of the resistance value of the short circuit area SC as much as possible.

In the second modification of the second embodiment shown in FIG. 17, when it is determined that there is no cell 21 having the unchanged OCV from the initial value, the control flow may further be modified to stop the operations of the electric vehicle 10 and the fuel cell system 20 and measure the resistance value of the short circuit area SC by the same method as any of the methods of measuring the initial short circuit resistance described above.

Figure 18:
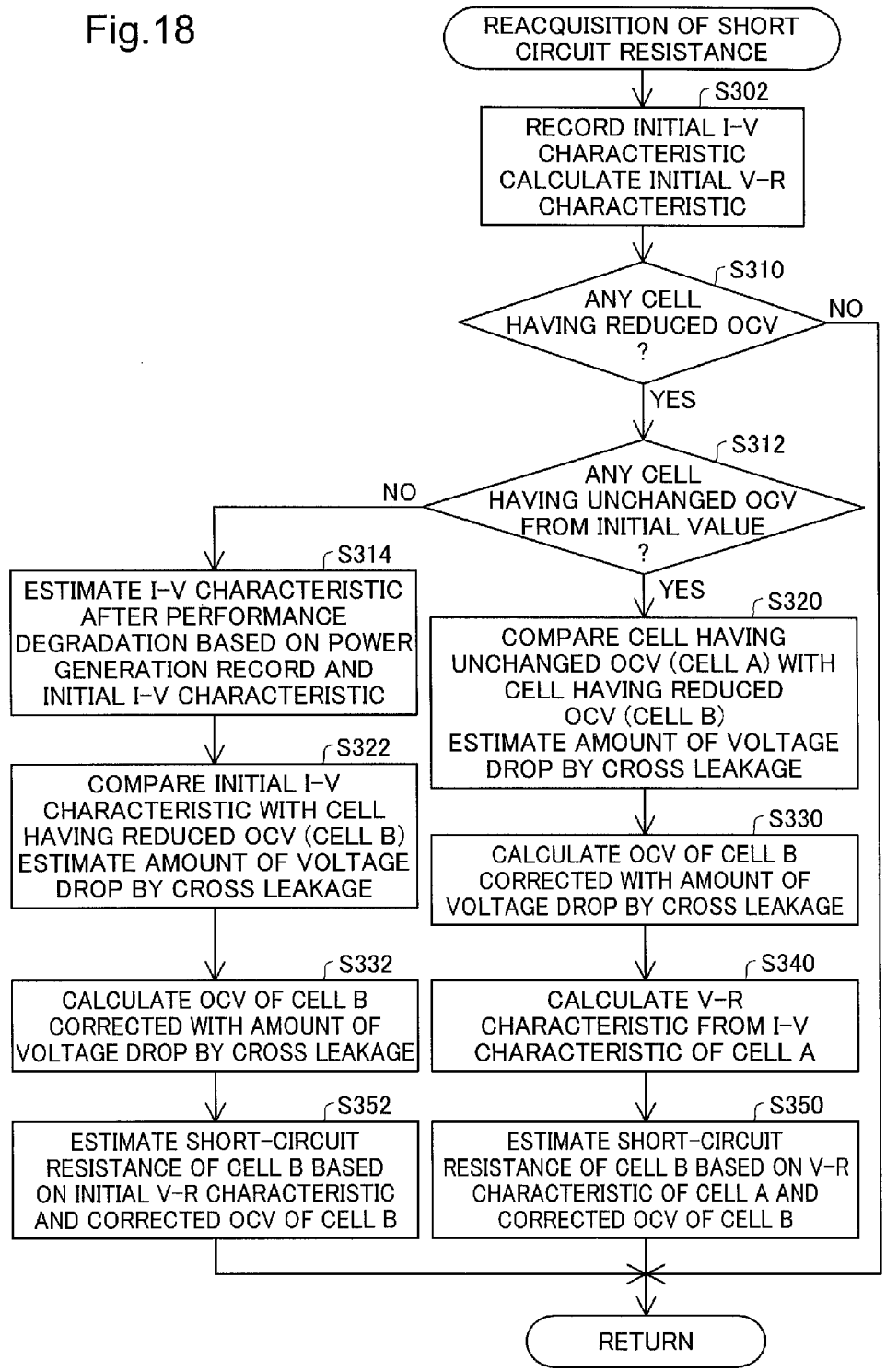
FIG. 18 is a flowchart showing the flow of reacquisition of the resistance value of the short circuit area SC (step S150 in FIG. 2) according to a third modification of the second embodiment.

FIG. 18 is a flowchart showing the flow of reacquisition of the resistance value of the short circuit area SC (step S150 in FIG. 2) according to a third modification of the second embodiment. The third modification of the second embodiment shown in FIG. 18 differs from the second modification of the second embodiment shown in FIG. 17 by an additional step of estimating the I-V characteristic after performance degradation based on the recorded initial characteristic and the power generation record (step S314) when it is determined that there is no cell 21 having the unchanged OCV from the initial value (step S312: No). The I-V characteristic after performance degradation may be estimated by any of known methods described in, for example, JP 2006-139935, H. A. Gasteiger et al., J. Electrochem. Soc., Vol. 152, pages A2256-A2271 (2005), R. M. Darling and J. P. Meyers, J. Electrochem. Soc., Vol. 150, pages A1523-A1527 (2003), and W. Bi and T. F. Fuller, J. Power Sources, Vol. 178, pages 188-196 (2008). After estimating the I-V characteristic after performance degradation, the control flow makes a comparison between the estimated I-V characteristic after performance degradation and the I-V characteristic of the cell B having the reduced OCV and estimates the resistance value of the short circuit area SC in the cell B (steps S322 to S352), in the same manner as the second modification of the second embodiment shown in FIG. 17.

Even when there is no cell 21 having the unchanged OCV from the initial value and the high-accuracy method of the second embodiment is accordingly not allowed, the third modification of the second embodiment shown in FIG. 18 estimates the I-V characteristic after performance degradation based on the initial characteristic and the power generation record, and estimates the resistance value of the short circuit area SC in the cell B based on the estimated I-V characteristic after performance degradation. This improves the estimation accuracy of the resistance value of the short circuit area SC.

C. Third Embodiment

C-1. Reacquisition of Resistance Value of Short Circuit Area

Figure 19:
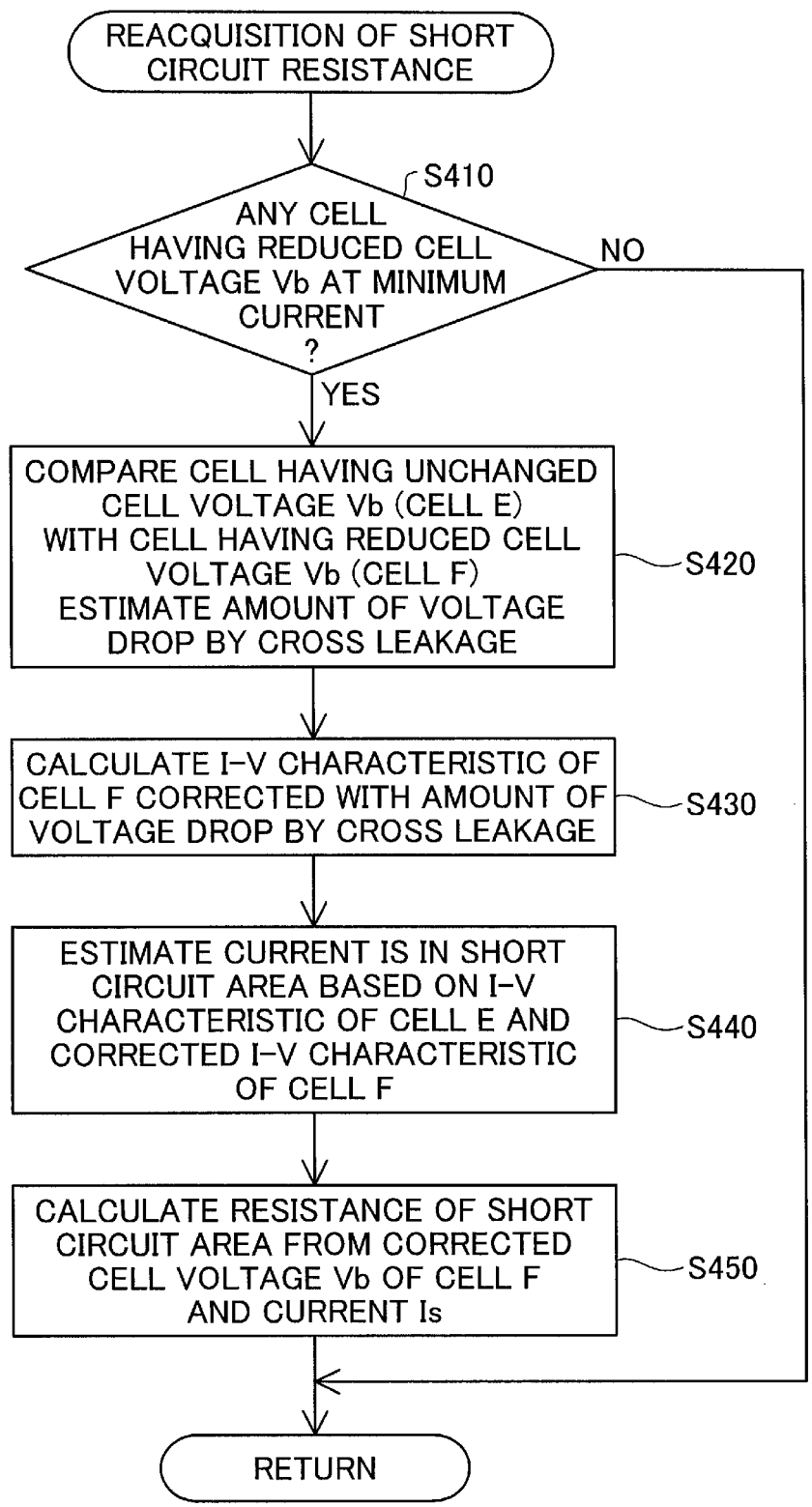
FIG. 19 is a flowchart showing the flow of reacquiring the resistance value of the short circuit area SC (step S150 in FIG. 2) according to a third embodiment.

FIG. 19 is a flowchart showing the flow of reacquiring the resistance value of the short circuit area SC (step S150 in FIG. 2) according to a third embodiment. Like the second embodiment, the third embodiment estimates and thereby reacquires the resistance value of the short circuit area SC based on the characteristic of each cell 21 of the fuel cell 22 at a predetermined timing after shipment of the fuel cell system 20. The difference from the second embodiment is that the third embodiment estimates the resistance value of the short circuit area SC without measuring the OCV of each cell 21.

The controller 70 (FIG. 1) determines whether there is any cell 21 having reduction of cell voltage during power generation at a predetermined low load (i.e., minimum current Ib) (hereinafter referred to as "voltage Vb at the minimum current") from its initial value (step S410). The predetermined minimum current Ib may be any value greater than 0 and is 0.1 A/cm² according to this embodiment. The controller 70 stores an initial value of the voltage Vb at the minimum current of each cell 21, measures the voltage Vb at the minimum current of each cell 21 and makes a comparison between the stored initial value and the measured voltage Vb at the minimum current for this determination. In general, like the reduction of the OCV, the reduction of the voltage Vb at the minimum current is caused by both the reduced resistance value of the shot circuit area SC and the cross leakage CL. When it is determined that there is no cell 21 having the reduced voltage Vb at the minimum current, the controller 70 detects the absence of any cell 21 having the decreased resistance value of the short circuit area SC and continues operations without resetting the threshold values V1 and V2 (step S130 in FIG. 2).

Figure 20A:
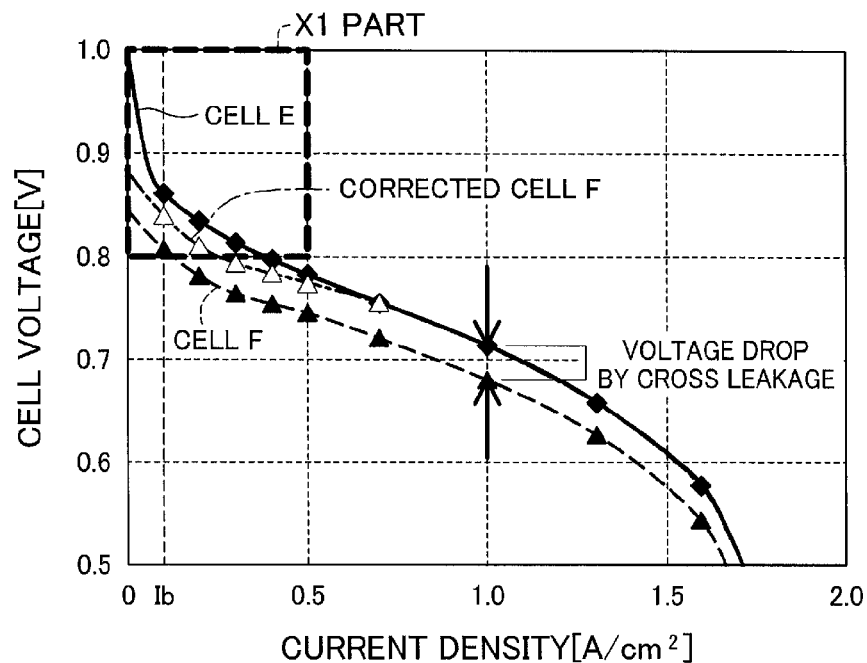
FIGS. 20A and 20B illustrate one example of measurement results of the I-V characteristic of the cell 21.
Figure 20B:
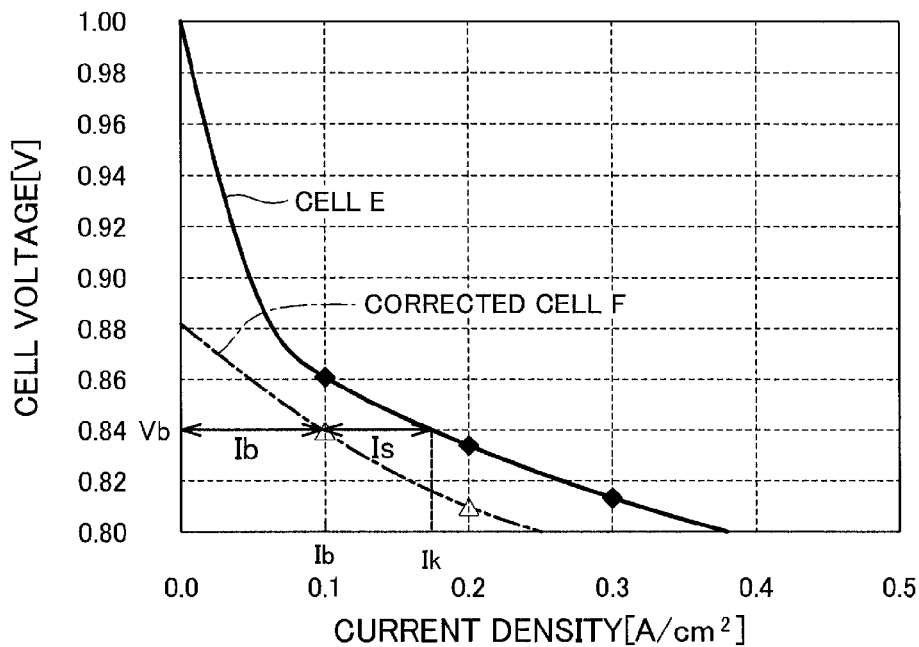

When it is determined at step S410 that there is any cell 21 having the reduced voltage Vb at the minimum current from the initial value, the controller 70 measures the I-V characteristic of the cell 21 having the reduced voltage Vb at the minimum current (hereinafter also referred to as cell F) and the I-V characteristic of the cell 21 having the unchanged voltage Vb at the minimum current (hereinafter also referred to as cell E), makes a comparison between these two I-V characteristics and estimates the amount of voltage drop due to the cross leakage CL (step S420). FIGS. 20A and 20B illustrate one example of measurement results of the I-V characteristic of the cell 21. FIG. 20A shows the measurement results of the I-V characteristic of the cell E having the unchanged voltage Vb at the minimum current and the I-V characteristic of the cell F having the reduced voltage Vb at the minimum current. FIG. 20B is the close-up view of an X1 part of FIG. 20A. The amount of voltage drop due to the cross leakage CL is estimated by the same method as that of the first embodiment shown in FIG. 13. More specifically, the voltage difference at a specified high load (for example, at the electric current of 1.0 A/cm²) between the two I-V characteristics is estimated as the amount of voltage drop due to the cross leakage CL.

The controller 70 subsequently calculates the I-V characteristic of the cell F corrected with the amount of voltage drop due to the cross leakage CL (step S430). FIGS. 20A and 20B also show the I-V characteristic of the cell F corrected with the amount of voltage drop due to the cross leakage CL (i.e., I-V characteristic of the cell F assumed to have no voltage drop due to the cross leakage CL). The corrected I-V characteristic of the cell F is obtained by entirely increasing the uncorrected I-V characteristic of the cell F by the amount of voltage drop due to the cross leakage CL. When the calculated corrected voltage Vb at the minimum current of the cell F is equal to the voltage Vb at the minimum current of the cell A, it is thought that the reduction of the voltage Vb at the minimum current is ascribed to only the cross leakage CL. The control flow accordingly has no need to reacquire the resistance value of the short circuit area SC in the cell F and continues power generation without executing the subsequent steps in FIG. 19.

The controller 70 subsequently estimates the current Is flowing through the short circuit area SC in the cell F, based on the I-V characteristic of the cell E and the corrected I-V characteristic of the cell F (step S440). The minimum current Ib is a preset value, and the corrected voltage Vb at the minimum current of the cell F is calculable from the corrected I-V characteristic of the cell F. The controller 70 calculates the current Ik in the I-V characteristic of the cell E corresponding to the corrected voltage Vb at the minimum current of the cell F and estimates the difference between the current Ik and the minimum current Ib as the current Is flowing through the short circuit area SC as shown in FIG. 20B.

Figure 21:
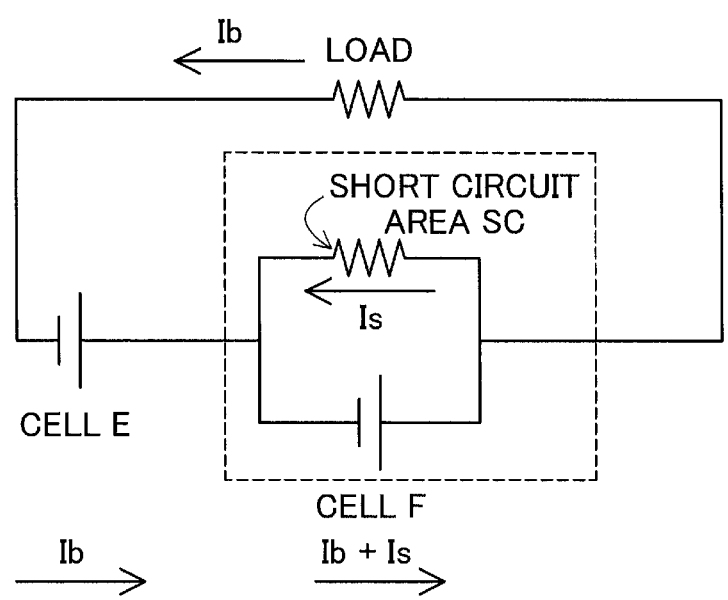
FIG. 21 illustrates a method of estimating the current Is of the short circuit area SC.

FIG. 21 illustrates a method of estimating the current Is of the short circuit area SC. FIG. 21 shows a circuit structure including a cell E without the short circuit area SC, a cell F with the short circuit area SC and a load. When the I-V characteristic of the cell F without the short circuit area SC is assumed to be identical with the I-V characteristic of the cell E, the cell F is required to generate electric power to meet the current Is flowing through the short circuit area SC inside the cell F in addition to the current Ib flowing through the load. It is accordingly expected that the voltage Vb at the minimum current of the cell F is less than the voltage Vb at the minimum current of the cell E. The inherent I-V characteristic of the cell F is identical with the I-V characteristic of the cell E, so that the cell F is expected to make the electric current in the I-V characteristic of the cell E corresponding to the voltage Vb at the minimum current. The current Is of the short circuit area SC is accordingly estimable to be equal to the difference by subtracting the minimum current Ib from the current Ik in the I-V characteristic of the cell E corresponding to the voltage Vb at the minimum current of the cell F as shown in FIG. 20B.

The controller 70 then calculates the resistance value of the short circuit area SC from the corrected voltage Vb at the minimum current of the cell F and the estimated current Is of the short circuit area SC (step S450). When it is determined at step S410 in FIG. 19 that there are a plurality of cells 21 having the reduced voltage Vb at the minimum current, the processing of steps S420 to S450 is repeated for each of the plurality of cells 21 to estimate the resistance value of the short circuit area SC in each of the cells 21.

When the resistance value of the short circuit area SC in the cell F is reacquired by estimation, the third embodiment also updates the threshold values V1 and V2 (sets new threshold values V1 and V2) based on the reacquired or estimated resistance value (step S130 in FIG. 2). This enables the threshold values V1 and V2 to be adequately set by taking into account the time change in resistance value of the short circuit area SC in the cell 21 and effectively prevents a pinhole from being made in the electrolyte membrane.

The second embodiment described above measures the OCV of each cell 21 for estimating the resistance of the short circuit area SC. For the improved durability of the fuel cell 22, however, it is preferable to avoid application of the OCV and drive the fuel cell 22 at no load. The third embodiment does not require measurement of the OCV of each cell 21 for estimating the resistance value of the short circuit area SC. This effectively prevents a pinhole from being made in the electrolyte membrane of the fuel cell 22, while improving the durability of the fuel cell 22.

C-2. Modifications of Third Embodiment

Figure 22:
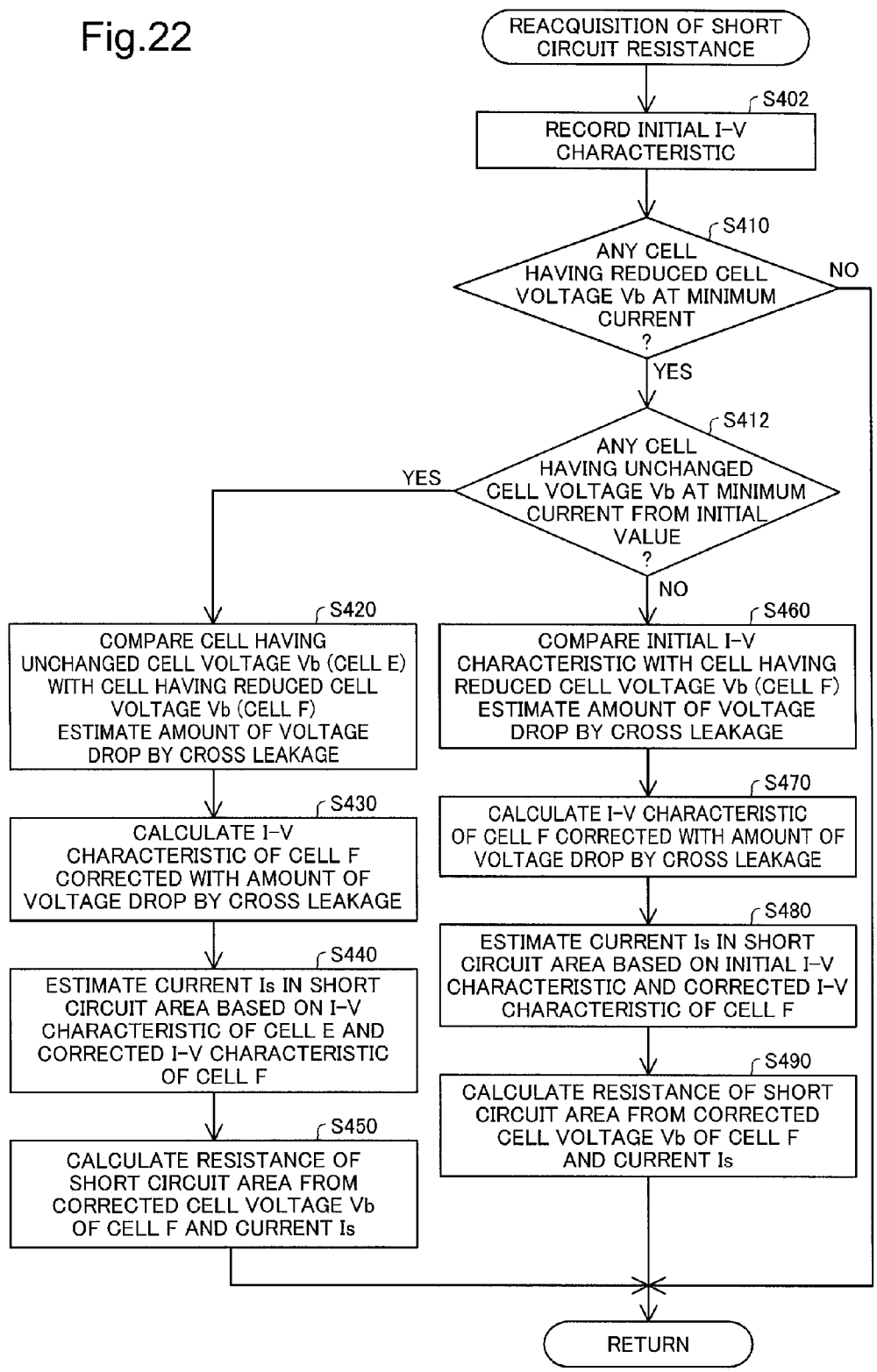
FIG. 22 is a flowchart showing the flow of reacquisition of the resistance value of the short circuit area SC (step S150 in FIG. 2) according to a first modification of the third embodiment.

FIG. 22 is a flowchart showing the flow of reacquisition of the resistance value of the short circuit area SC (step S150 in FIG. 2) according to a first modification of the third embodiment. The first modification of the third embodiment shown in FIG. 22 records the I-V characteristic of the cell 21 before shipment (initial I-V characteristic) (step S402) and determines whether there is any cell 21 having the reduced voltage Vb at the minimum current from the initial value (step S410). When it is determined that there is any cell 21 having the reduced voltage Vb at the minimum current, the control flow subsequently determines whether there is any cell 21 having the unchanged voltage Vb at the minimum current from the initial value (step S412). When it is determined that there is no cell 21 having the unchanged voltage Vb at the minimum current from the initial value, the control flow makes a comparison between the cell F having the reduced voltage Vb at the minimum current and the recorded initial I-V characteristic, instead of the I-V characteristic of the cell 21 having the unchanged voltage Vb at the minimum current (cell E) used in the third embodiment described above (FIG. 19), and thereby estimates the resistance value of the short circuit area SC in the cell F (steps S460 to S490). When it is determined that there is any cell 21 having the unchanged voltage Vb at the minimum current from the initial value, on the other hand, the control flow makes a comparison between the cell 21 having the unchanged voltage Vb at the minimum current (cell E) and the cell 21 having the reduced voltage Vb at the minimum current (cell F) and thereby estimates the resistance value of the short circuit area SC in the cell F (steps S420 to S450), in the same manner as the third embodiment shown in FIG. 19.

The modified control flow shown in FIG. 22 employs the estimation method of the higher accuracy (i.e., the method of the third embodiment) when there is any cell 21 having the unchanged voltage Vb at the minimum current from the initial value and the method of the third embodiment is accordingly allowed. Even when there is no cell 21 having the unchanged voltage Vb at the minimum current, this modified control flow uses the initial I-V characteristic to estimate the resistance value of the short circuit area SC in the cell F. This enables control of the fuel cell 22 to effectively prevent a pinhole from being made in the electrolyte membrane of the fuel cell 22 and reduce the complexity of the system configuration and the control procedure. This can also deal with diverse situations and improve the estimation accuracy of the resistance value of the short circuit area SC as much as possible.

Figure 23:
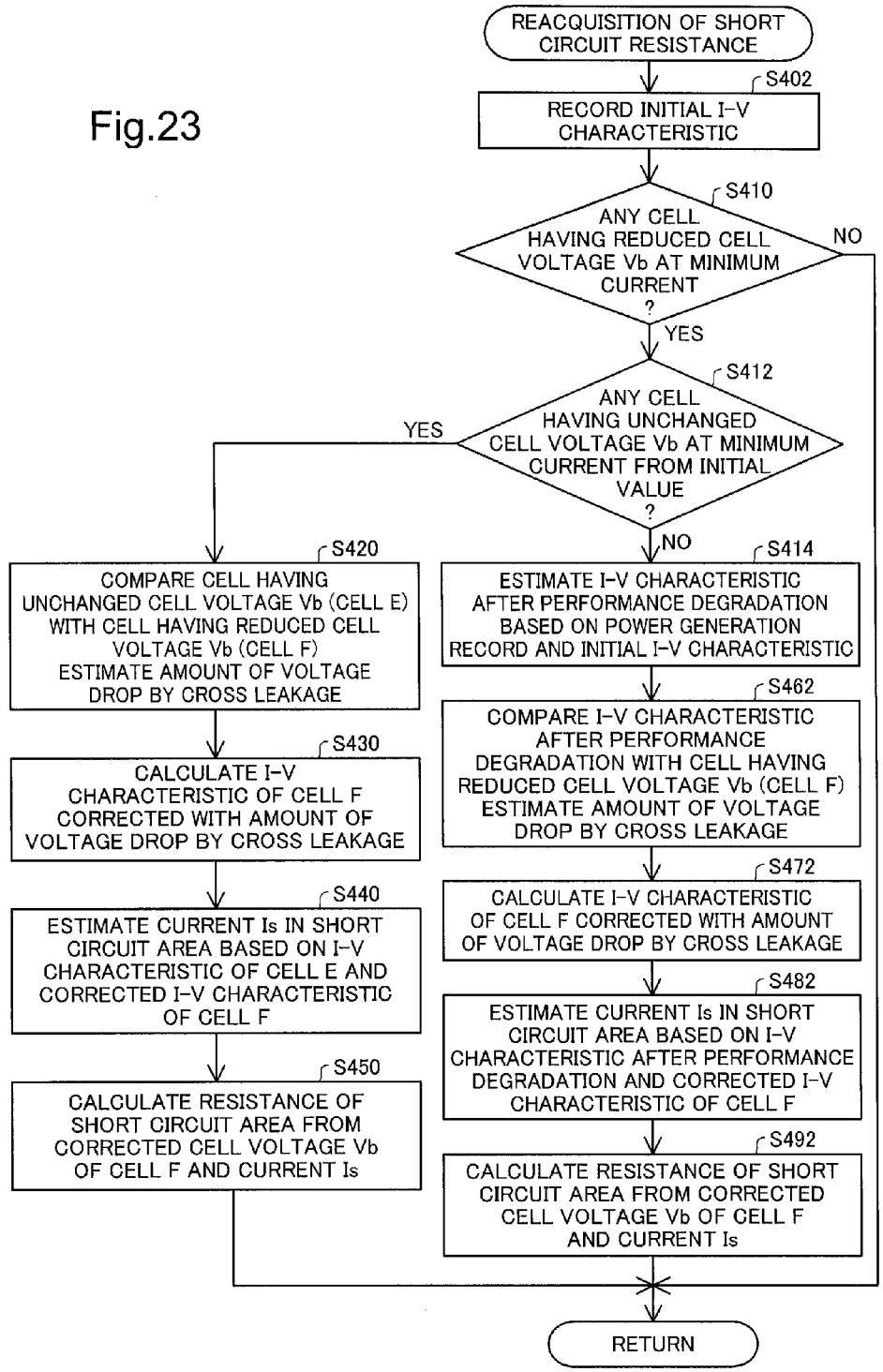
FIG. 23 is a flowchart showing the flow of reacquisition of the resistance value of the short circuit area SC (step S150 in FIG. 2) according to a second modification of the third embodiment.

FIG. 23 is a flowchart showing the flow of reacquisition of the resistance value of the short circuit area SC (step S150 in FIG. 2) according to a second modification of the third embodiment. The second modification of the third embodiment shown in FIG. 23 differs from the first modification of the third embodiment shown in FIG. 22 by the processing flow when it is determined that there is no cell 21 having the unchanged voltage Vb at the minimum current from the initial value (step S412: No). The modified control flow shown in FIG. 23 estimates the I-V characteristic after performance degradation, based on the recorded initial I-V characteristic and the power generation record (step S414), when it is determined that there is no cell 21 having the unchanged voltage Vb at the minimum current from the initial value. The I-V characteristic after power degradation may be estimated by any of the known methods mentioned above. After estimating the I-V characteristic after performance degradation, the modified control flow makes a comparison between the estimated I-V characteristic after performance degradation and the I-V characteristic of the cell F having the reduced voltage Vb at the minimum current and thereby estimates the resistance value of the short circuit area SC in the cell F (steps S462 to S492), in a similar manner to the first modification of the third embodiment shown in FIG. 22.

Even when there is no cell 21 having the unchanged voltage Vb at the minimum current from the initial value and the high-accuracy method of the third embodiment is accordingly not allowed, the second modification of the third embodiment shown in FIG. 23 estimates the I-V characteristic after performance degradation based on the initial I-V characteristic and the power generation record, and estimates the resistance value of the short circuit area SC in the cell F based on the estimated I-V characteristic after performance degradation. This improves the estimation accuracy of the resistance value of the short circuit area SC.

Figure 24:
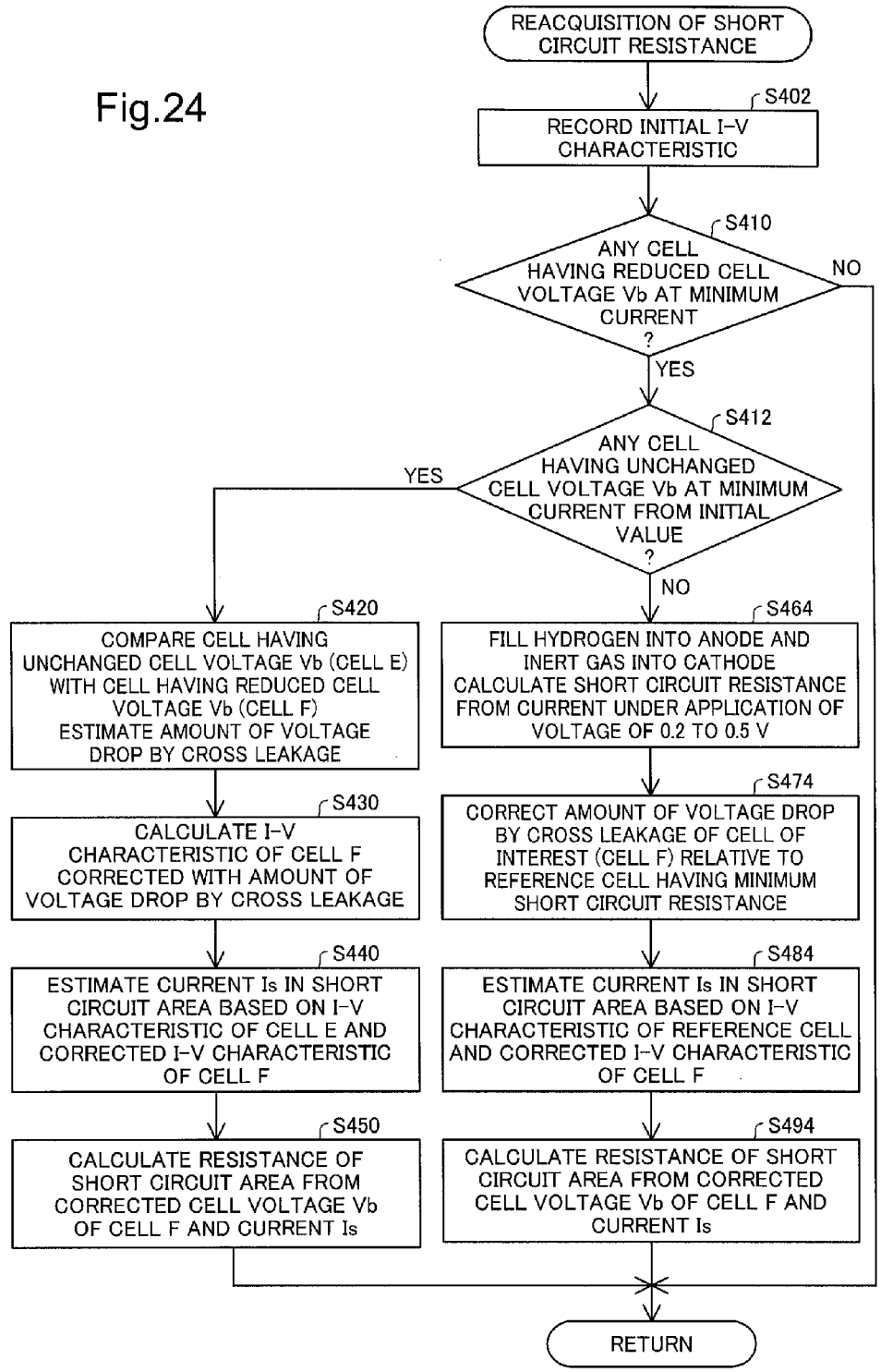
FIG. 24 is a flowchart showing the flow of reacquisition of the resistance value of the short circuit area SC (step S150 in FIG. 2) according to a third modification of the third embodiment.

FIG. 24 is a flowchart showing the flow of reacquisition of the resistance value of the short circuit area SC (step S150 in FIG. 2) according to a third modification of the third embodiment. The third modification of the third embodiment shown in FIG. 24 differs from the second modification of the third embodiment shown in FIG. 23 by the processing flow when it is determined that there is no cell 21 having the unchanged voltage Vb at the minimum current from the initial value (step S412: No). The modified control flow shown in FIG. 24 measures the resistance value of the short circuit area SC in the cell 21 (step S464) by the same method as any of the methods of measuring the initial short circuit resistance described above, when it is determined that there is no cell 21 having the unchanged voltage Vb at the minimum current from the initial value. More specifically, the method supplies hydrogen gas to the anode AE and nitrogen gas to the cathode CE, applies a predetermined voltage (0.2 to 0.5 V) and calculates the resistance value of the short circuit area SC from the current values at the respective voltage values.

Figure 25:
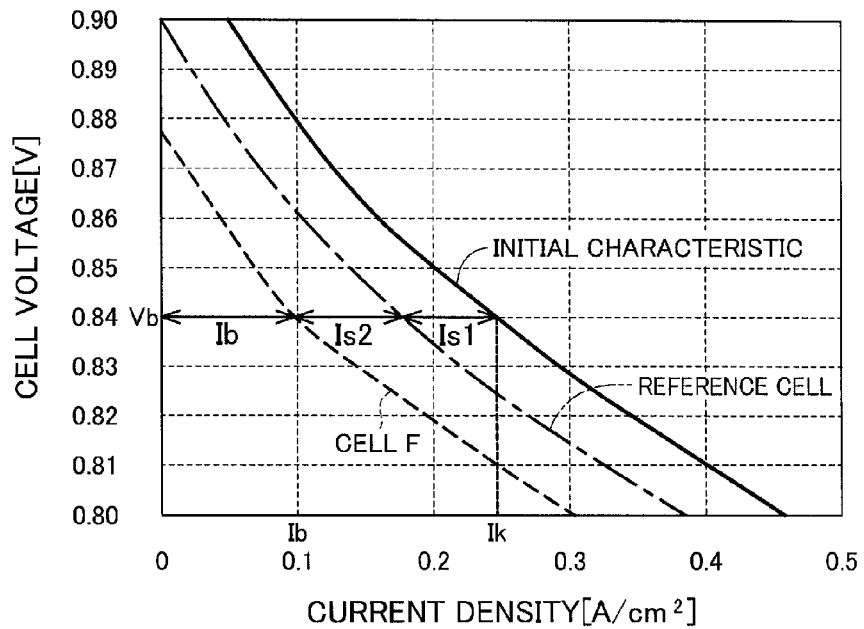
FIG. 25 illustrates a method of estimating the current of the short circuit area SC in the cell F.

The control flow subsequently sets the cell 21 having the minimum resistance value of the short circuit area SC to a reference cell, makes a comparison between the I-V characteristic of the reference cell and the I-V characteristic of the cell of interest (cell F) as an object of estimation of the resistance value of the short circuit area SC and estimates the amount of voltage drop due to the cross leakage CL (step S474). The control flow then estimates the current Is flowing through the short circuit area SC in the cell F, based on the I-V characteristic of the reference cell, the I-V characteristic of the cell F corrected with the amount of voltage drop due to the cross leakage CL, and the short circuit resistance of the reference cell (step S484). More specifically, as shown in FIG. 25, the control flow estimates electric current Is1 flowing through the short circuit area SC based on the resistance value of the short circuit area SC of the reference cell and the voltage Vb at the minimum current by the same method as that of the third embodiment shown in FIG. 20B, and estimates current Is2 flowing through the short circuit area SC in the cell F based on the estimated current Is1. The control flow subsequently calculates the resistance value of the short circuit area SC from the corrected voltage Vb at the minimum current of the cell F and the estimated current Is2 of the short circuit area SC (step S494).

Even when there is no cell 21 having the unchanged voltage Vb at the minimum current from the initial value, the third modification of the third embodiment shown in FIG. 24 estimates the resistance value of the short circuit area SC in the cell F based on the I-V characteristic of the reference cell, which is subjected to measurement of the resistance value of the short circuit area SC. This improves the estimation accuracy of the resistance value of the short circuit area SC.

D. Fourth Embodiment

Figure 26:
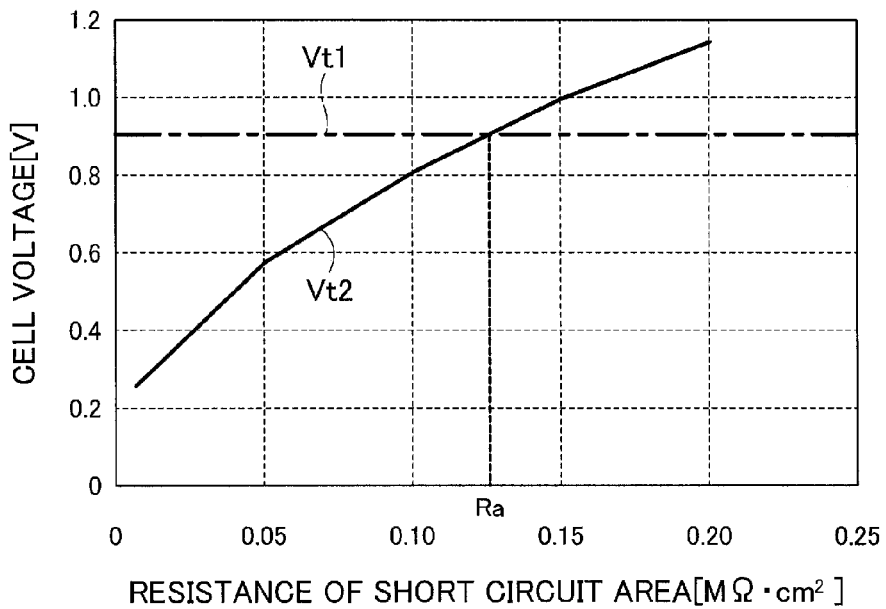
FIG. 26 illustrates one example of voltage threshold values during control of the fuel cell 22 according to a fourth embodiment.
Figure 27:
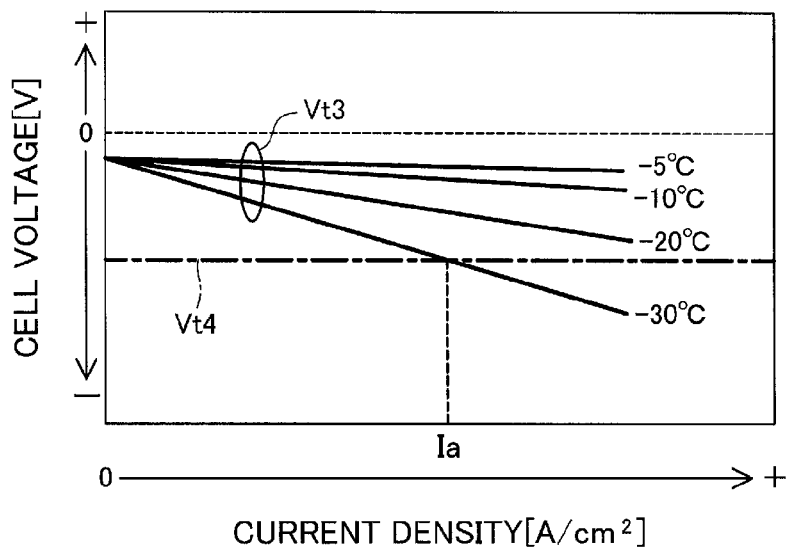
FIG. 27 illustrates one example of voltage threshold values during control of the fuel cell 22 according to a fourth embodiment.

FIGS. 26 and 27 illustrate one example of voltage threshold values during control of the fuel cell 22 according to a fourth embodiment. In the first through the third embodiments, the voltage threshold values are set from the viewpoint of preventing a pinhole from being made in the electrolyte membrane ME. The voltage threshold values during control of the fuel cell 22 may be set from another viewpoint of preventing performance degradation of the fuel cell 22. The fourth embodiment controls the fuel cell 22 using a plurality of voltage threshold values set from a plurality of different viewpoints.

FIG. 26 shows upper threshold limits of voltage during normal power generation (i.e., power generation at the cell voltage of or above 0 V). A threshold value Vt2 shown in FIG. 26 represents an upper threshold limit of voltage set from the viewpoint of preventing a pinhole from being made in the electrolyte membrane ME (see FIG. 9). A threshold value Vt1 represents an upper threshold limit of voltage set from the viewpoint of avoiding the OCV for the purpose of the improved durability of the fuel cell 22. The control of the fuel cell 22 according to the fourth embodiment actually uses the safety threshold value, i.e., the smaller threshold value, between the two upper threshold limits set from the two different viewpoints. The illustrated example of FIG. 26 uses the threshold value Vt2 when the resistance value of the short circuit area SC in the cell 21 is not less than a value Ra, while using the threshold value Vt1 when the resistance value is greater than the value Ra.

Figure 28:
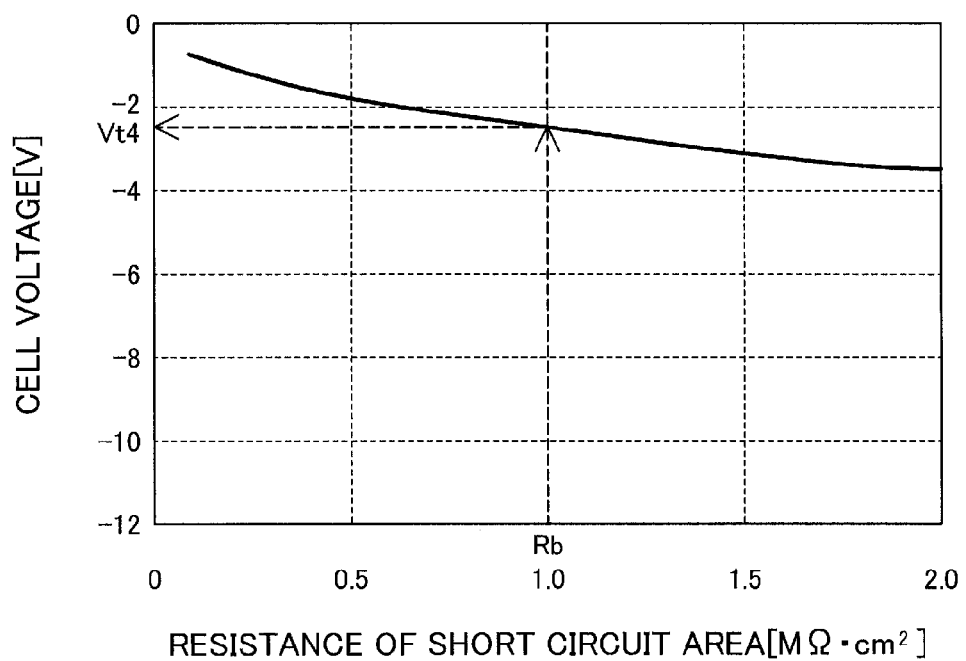
FIG. 28 illustrates one exemplary method of setting the threshold value Vt4.

FIG. 27 shows lower threshold limits of voltage during power generation at negative voltage (i.e., power generation at the cell voltage below 0 V) of the cell 21 having a resistance value Rb of the short circuit area SC. A threshold value Vt4 shown in FIG. 27 represents a lower threshold limit of voltage set from the viewpoint of preventing a pinhole from being made in the electrolyte membrane ME. FIG. 28 illustrates one exemplary method of setting the threshold value Vt4. As shown in FIG. 28, the threshold value Vt4 corresponds to the resistance value Rb in the threshold value distribution against the resistance value of the short circuit area SC (see FIG. 8) set from the viewpoint of preventing a pinhole from being made in the electrolyte membrane ME. A threshold value Vt3 represents a lower threshold limit of voltage at each cell temperature set from the viewpoint of avoiding hydrogen deficiency as described in JP 2008-27704. The control of the fuel cell 22 according to the fourth embodiment actually uses the safety threshold value, i.e., the greater threshold value, between the two lower threshold limits set from the two different viewpoints. The illustrated example of FIG. 27 uses the threshold value Vt3 at the cell temperature of or above −20° C. and at the cell temperature of or below −30° C. in combination with the current density of or below Ia, while using the threshold value Vt4 at the cell temperature of or below −30° C. in combination with the current density above Ia.

Figure 29:
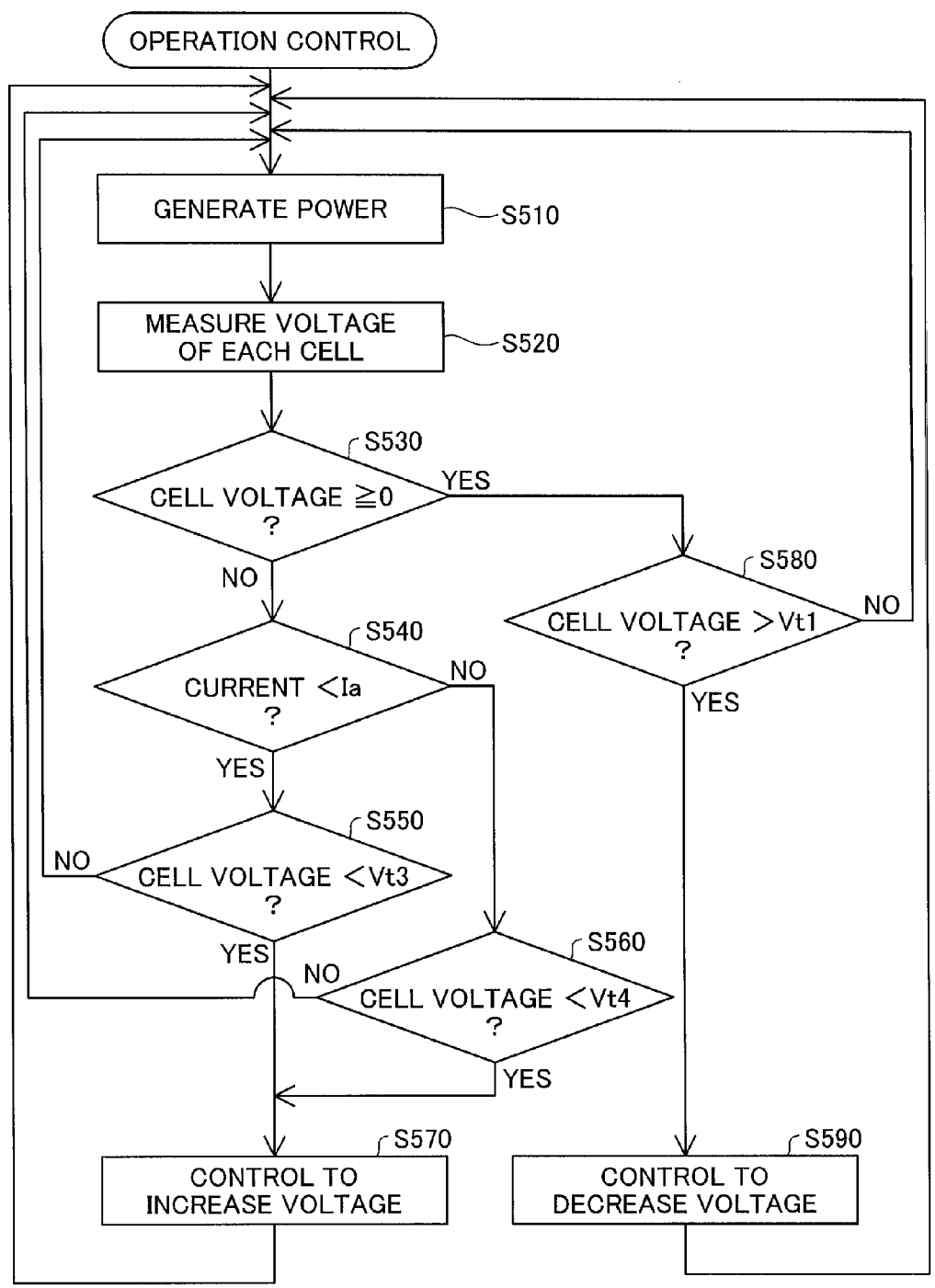
FIG. 29 is a flowchart showing the flow of operation control of the fuel cell 22 according to the fourth embodiment.

FIG. 29 is a flowchart showing the flow of operation control of the fuel cell 22 (step S140 in FIG. 2) according to the fourth embodiment. FIG. 29 shows the flow of operation control under the conditions that the resistance value of the short circuit area SC in the cell 21 is equal to 1.0 megaohm·cm$^2$ and the cell temperature is equal to −30° C. The control flow starts power generation by the fuel cell 22 (step S510) and measures the voltage of each cell 21 at a predetermined timing (step S520). When the cell voltage of the cell 21 is equal to or greater than 0V (step S530: Yes), the control flow determines whether the cell voltage is greater than the threshold value Vt1 (step S580) according to the map of FIG. 26. When the cell voltage is not greater than the threshold value Vt1 (step S580: No), the control flow continues power generation. When the cell voltage is greater than the threshold value Vt1 (step S580: Yes), on the other hand, the control flow performs control to decrease the cell voltage (step S590). This prevents a pinhole from being made in the electrolyte membrane ME during normal power generation, while avoiding the OCV and improving the durability of the fuel cell 22.

When the cell voltage of the cell 21 is less than 0 V (step S530: No), on the other hand, the control flow subsequently determines whether the current density is less than Ia (step S540) according to the map of FIG. 27. When the current density is less than Ia, the control flow subsequently determines whether the cell voltage is less than the threshold value Vt3 (step S550). When the current density is not less than Ia, on the other hand, the control flow subsequently determines whether the cell voltage is less than the threshold value Vt4 (step S560). When the cell voltage is not less than the threshold value Vt3 (step S550: No) or when the cell voltage is not less than the threshold value Vt4 (step S560: No), the control flow continues power generation. When the cell voltage is less than the threshold value Vt3 (step S550: Yes) or when the cell voltage is less than the threshold value Vt4 (step S560: Yes), on the other hand, the control flow performs control to increase the cell voltage (step S570). This prevents a pinhole from being made in the electrolyte membrane ME during power generation at negative voltage, while avoiding hydrogen deficiency.

As described above, the fourth embodiment takes into account the voltage threshold values set from the viewpoint of preventing a pinhole from being made in the electrolyte membrane ME and the voltage threshold values set from different viewpoints and controls the fuel cell 22 with the most safety threshold values. More specifically, the fuel cell 22 is controlled, such that the voltage value of the cell 21 is within the range defined by the voltage threshold values set from the viewpoint of preventing a pinhole from being made in the electrolyte membrane ME and within the range defined by the voltage threshold values set from the different viewpoints. The fourth embodiment accordingly enables control of the fuel cell 22 with higher robustness, while effectively preventing a pinhole from being made in the electrolyte membrane of the fuel cell 22. The fourth embodiment also efficiently avoids potential degradation or deterioration of the fuel cell 22 in a plurality of deterioration modes.

E. Fifth Embodiment

Figure 30:
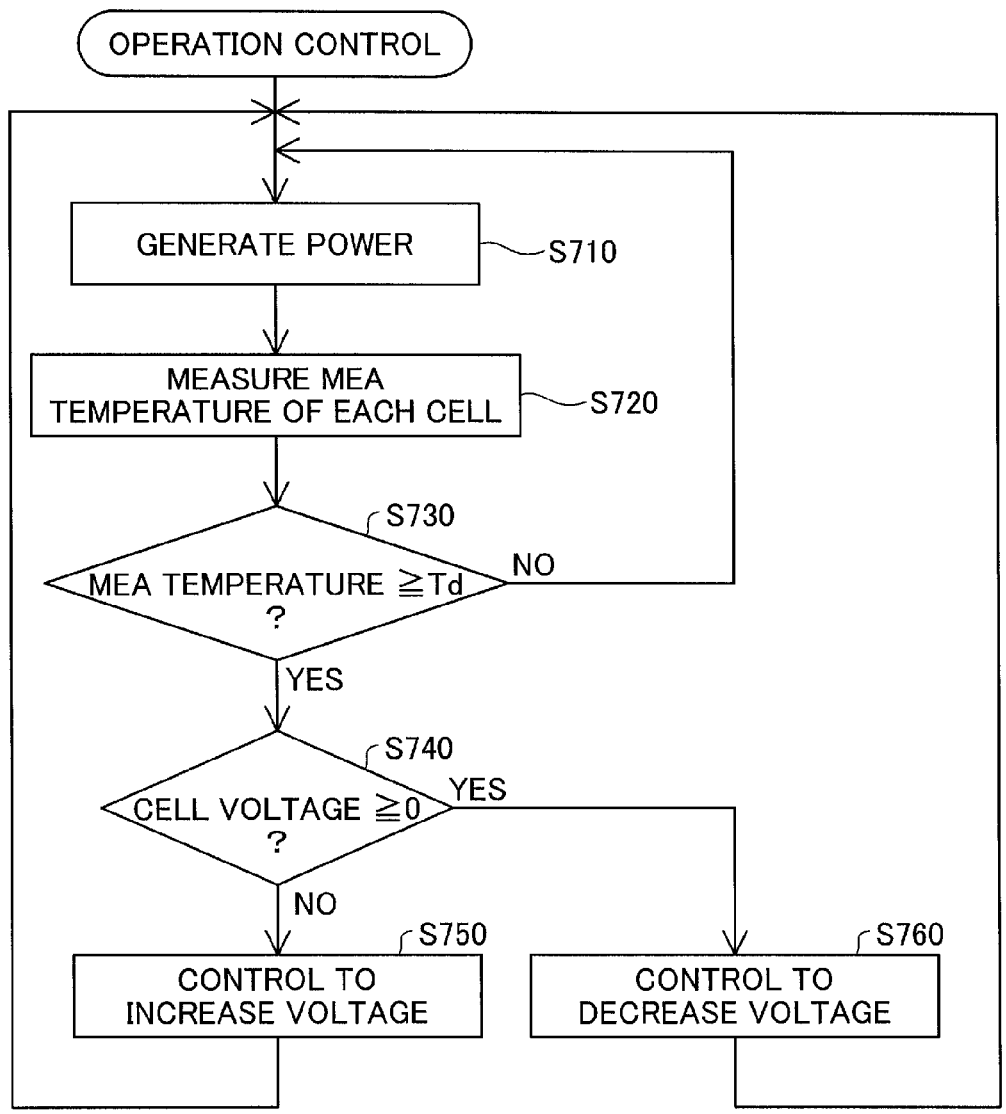
FIG. 30 is a flowchart showing the flow of operation control of the fuel cell 22 according to a fifth embodiment.
Figure 31A:
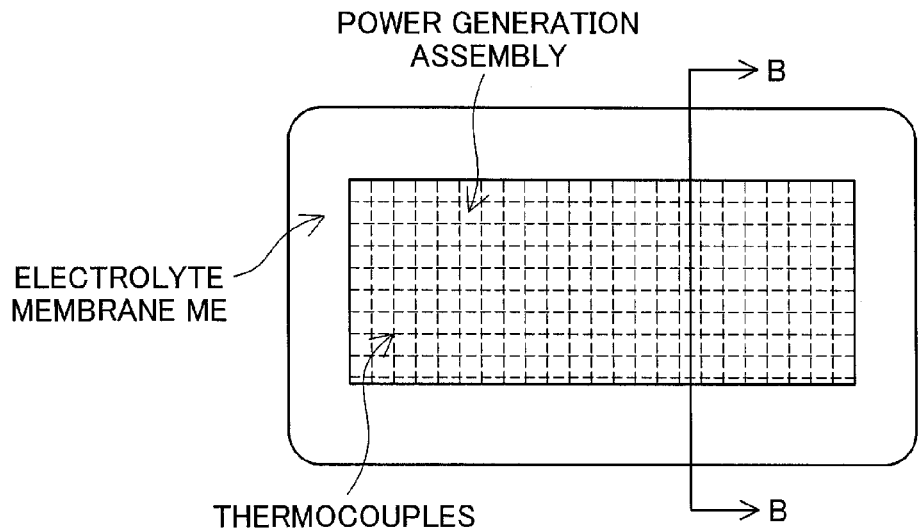
FIGS. 31A and 31B illustrate one exemplary method of measuring the MEA temperature of the cell 21.
Figure 31B:
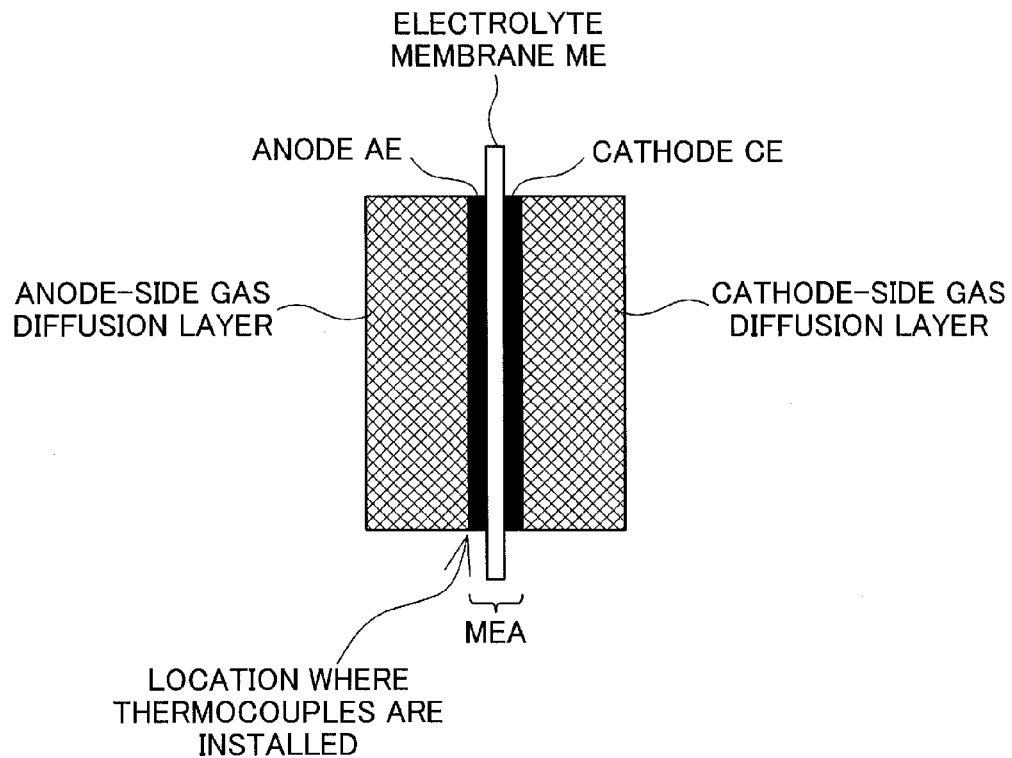

FIG. 30 is a flowchart showing the flow of operation control of the fuel cell 22 (step S140 in FIG. 2) according to a fifth embodiment. The operation control of the fifth embodiment differs from the operation control of the first embodiment that measures the cell voltage (see FIG. 10) by measuring the MEA temperature of each cell 21 with thermocouples at a predetermined timing during power generation (step S710). FIGS. 31A and 31B illustrate one exemplary method of measuring the MEA temperature of the cell 21. FIG. 31A shows the plane of the electrolyte membrane ME of the cell 21. FIG. 31B shows the cross section of the cell 21 at the position B-B of FIG. 31A. As shown in FIG. 31B, thermocouples are placed at the interface between the MEA and the gas diffusion layer on the anode AE-side according to this embodiment. As shown in FIG. 31A, the thermocouples may be provided, for example, at one location per 1 $cm^2$ in the power generation assembly of the MEA (having the electrodes formed on the electrolyte membrane ME). Locating the thermocouples on the anode AE-side is less contradictory between gas diffusion and discharge of produced water and is thus more preferable, compared with locating the thermocouples on the cathode CE-side. Locating the thermocouples at the interface between the MEA and the gas diffusion layer enables the higher-accuracy measurement of the MEA temperature and is thus more preferable, compared with locating the thermocouples on the outer surface of the gas diffusion layer. The thermocouples used for measuring the MEA temperature may be, for example, K-type thermocouples having the strand diameter of 25 μm (manufactured by ANBE SMT Co.) or parylene coating of 10 μm (manufactured by Parylene Japan KK).

The control flow compares the measured MEA temperature with the decomposition temperature Td (for example, 300° C.) of the electrolyte membrane ME (step S730). When the MEA temperature is lower than the decomposition temperature Td (step S730: No), the control flow determines that there is no possibility of a pinhole made in the electrolyte membrane ME and continues power generation (step S710). When the MEA temperature is equal to or higher than the decomposition temperature Td (step S730: Yes), on the other hand, the control flow determines that there is a possibility of a pinhole made in the electrolyte membrane ME. During normal power generation (step S740: Yes), the control flow performs control to decrease the cell voltage (step S760). During power generation at negative voltage (step S740: No), the control flow performs control to increase the cell voltage (step S750).

Figure 32:
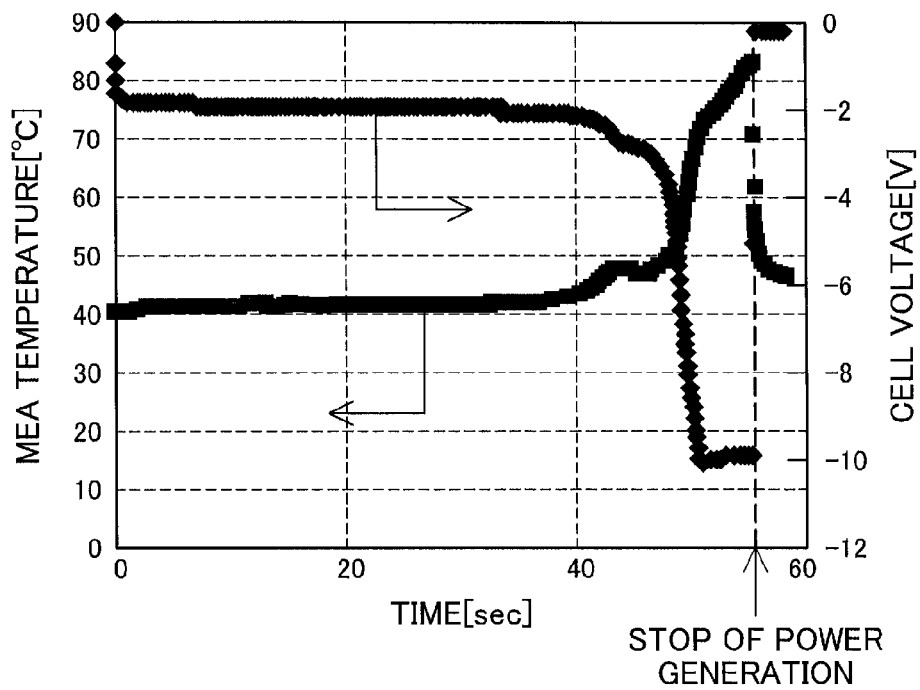
FIG. 32 illustrates one example of experimental results to check the relationship between the cell voltage and the MEA temperature.

The MEA temperature may be controlled by regulating the voltage of the cell 21. FIG. 32 illustrates one example of experimental results to check the relationship between the cell voltage and the MEA temperature. FIG. 32 shows the measurement results of the MEA temperature and the cell voltage on the load shutoff when the cell voltage reaches −10V during power generation with the current density of 0.4 $A/cm^2$ and supply of nitrogen having the relatively humidity of 100% to both the electrodes. The results shown in FIG. 32 prove that the MEA temperature decreases with an increase in cell voltage during power generation at negative voltage. The MEA temperature decreases with a decrease in cell voltage during normal power generation, although not being specifically illustrated. The control to decrease the cell voltage during normal power generation and the control to increase the cell voltage during power generation at negative voltage described above lower the MEA temperature and thereby prevent a pinhole from being made in the electrolyte membrane ME.

F. Modifications

The invention is not limited to the above embodiments or modifications, but a multiplicity of variations and modifications may be made to the embodiments without departing from the scope of the invention. Some examples of possible modification are described below.

F1. Modification 1

In the embodiments described above, the voltage or the MEA temperature of each cell 21 is obtained as the temperature index value correlated to the temperature of the short circuit area SC in the cell 21. Another index value, such as current value, may be obtained as the temperature index value. In the embodiments described above, the voltage of the fuel cell 22 is used as the control parameter affecting the temperature of the short circuit area SC. Another control parameter, such as electric current, may be used for the same purpose.

F2. Modification 2

The above embodiments describe the electric vehicle 10 having the fuel cell system 20. The invention is, however, not limited to the fuel cell system 20 for the electric vehicle 10 but is also applicable to the fuel cell system 20 for other purposes. The configurations of the electric vehicle 10 and the fuel cell system 20 described in the above embodiments are only illustrative and may be modified, altered or changed in various ways.

What is claimed is:

1. A fuel cell system having a fuel cell including at least one cell with an electrolyte membrane, the fuel cell system comprising:
    an index value acquirer configured to obtain a temperature index value correlated to temperature of a short circuit area in each cell;
    a controller configured to control a control parameter of the fuel cell affecting the temperature of the short circuit area, such that the temperature index value is within a predetermined range set to make the temperature of the short circuit area lower than a decomposition temperature of the electrolyte membrane to keep each cell within the fuel cell generating; and
    a resistance value acquirer configured to obtain a resistance value of the short circuit area, wherein
    the controller is programmed to set the predetermined range of the temperature index value, based on the resistance value of the short circuit area,
    the temperature index value is a voltage value of each cell, and
    the controller is programmed to determine whether a voltage value at low load of each cell, is reduced from an initial value, makes a comparison between a first characteristic and a second characteristic, controls the resistance value acquirer to reacquire the resistance value of the short circuit area when there is a reduction of a corrected voltage value at low load from the initial value, and updates the predetermined range based on the reacquired resistance value of the short circuit area,
    the voltage value at low load of each cell is a voltage value of each cell at a specified low load,
    the first characteristic is an I-V characteristic from low load to high load of a first cell having reduced voltage at low load from the initial value,
    the second characteristic is an I-V characteristic from low load to high load having unchanged voltage at low load from the initial value,
    the corrected voltage value is a voltage value of the first characteristic corrected based on a difference in voltage value between the first characteristic and the second characteristic at a specified high load,
    the specified low load is greater than 0, and
    the specified high load is greater than the specified low load.

2. The fuel cell system according to claim 1, wherein the resistance value acquirer comprises:
    a module configured to supply a fuel gas to anode of the fuel cell and an inert gas to cathode of the fuel cell;
    a module configured to apply a varying voltage to the fuel cell;
    a module configured to measure a current value at each voltage value; and
    a module configured to calculate the resistance value, based on a relationship between voltage value and current value.

3. The fuel cell system according to claim 1, wherein the resistance value acquirer comprises:
    a module configured to supply an identical type of gas to anode and cathode of the fuel cell;
    a module configured to apply a voltage to the fuel cell;
    a module configured to measure a current value under application of the voltage; and a module configured to calculate the resistance value, based on a relationship between voltage value and current value.

4. The fuel cell system according to claim 3, wherein the identical type of gas is either one of a fuel gas and an oxidizing gas used for power generation by the fuel cell.

5. The fuel cell system according to claim 2, wherein the resistance value acquirer obtains the resistance value of the short circuit area before shipment of the fuel cell system.

6. The fuel cell system according to claim 2, wherein the resistance value acquirer obtains the resistance value of the short circuit area during regular check of the fuel cell system.

7. The fuel cell system according to claim 2, wherein the resistance value acquirer obtains the resistance value of the short circuit area at operation stop of the fuel cell.

8. The fuel cell system according to claim 1, wherein the control parameter is a voltage value of the fuel cell.

9. The fuel cell system according to claim 8, wherein when the temperature index value is out of the predetermined range, the controller performs control to decrease an absolute value of voltage of the fuel cell.

10. The fuel cell system according to claim 9, wherein when the temperature index value is out of the predetermined range and when the voltage value as the temperature index value is less than 0, the controller performs control to increase voltage of the fuel cell.

11. The fuel cell system according to claim 9, wherein when the temperature index value is out of the predetermined range and when the voltage value as the temperature index value is not less than 0, the controller performs control to decrease voltage of the fuel cell.

12. The fuel cell system according to claim 1, wherein the resistance value acquirer reacquires the resistance value of the short circuit area, based on a first voltage value at low load, which is the corrected voltage value at low load in the first characteristic, and a current value in the second characteristic corresponding to the first voltage value at low load.

13. The fuel cell system according to claim 1, wherein the controller sets at least one different predetermined range of the temperature index value for preventing performance degradation of the fuel cell and controls the control parameter of the fuel cell, such that the temperature index value is within the different predetermined range and within the predetermined range set to make the temperature of the short circuit area lower than the decomposition temperature of the electrolyte membrane.

14. A method of controlling a fuel cell including at least one cell with an electrolyte membrane, the method comprising:
    obtaining a temperature index value correlated to temperature of a short circuit area in each cell; and
    controlling a control parameter of the fuel cell affecting temperature of the short circuit area, such that the temperature index value is within a predetermined range set to make the temperature of the short circuit area lower than a decomposition temperature of the electrolyte membrane to keep each cell within the fuel cell generating;
    obtaining a resistance value of the short circuit area,
    setting the predetermined range of the temperature index value based on the resistance value of the short circuit area, the temperature index value being a voltage value of each cell, and
    determining whether a voltage value at low load of each cell, is reduced from an initial value, making a comparison between a first characteristic and a second characteristic, reacquiring the resistance value of the short circuit area when there is a reduction of a corrected voltage value at low load from the initial value, and updating the predetermined range based on the reacquired resistance value of the short circuit area, the voltage value at low load of each cell is a voltage value of each cell at a specified low load, the first characteristic is an I-V characteristic from low load to high load of a first cell having reduced voltage at low load from the initial value, the second characteristic is an I-V characteristic from low load to high load having unchanged voltage at low load from the initial value, the corrected voltage value is a voltage value of the first characteristic corrected based on a difference in voltage value between the first characteristic and the second characteristic at a specified high load, the specified low load is greater than 0, and the specified high load is greater than the specified low load.

* * * * *